US012365076B2

(12) United States Patent
Puzio et al.

(10) Patent No.: US 12,365,076 B2
(45) **Date of Patent: *Jul. 22, 2025**

(54) ELECTROMAGNETIC ACTUATOR FOR POWER TOOL

(71) Applicant: BLACK & DECKER INC., New Britain, CT (US)

(72) Inventors: Daniel Puzio, Baltimore, MD (US); Robert S. Gehret, Hampstead, MD (US); John D. Cox, Lutherville, MD (US); Robert J. Opsitos, Jr., Felton, PA (US); Robert G. Kusmierski, York, PA (US); Craig A. Schell, Street, MD (US); Michael T. Haupt, Abingdon, MD (US); Joseph P. Kelleher, Parkville, MD (US)

(73) Assignee: BLACK & DECKER INC., New Britain, CT (US)

( * ) Notice: Subject to any disclaimer, the term of this patent is extended or adjusted under 35 U.S.C. 154(b) by 983 days.

This patent is subject to a terminal disclaimer.

(21) Appl. No.: 17/345,848

(22) Filed: Jun. 11, 2021

(65) Prior Publication Data

US 2021/0299842 A1 Sep. 30, 2021

Related U.S. Application Data

(63) Continuation of application No. 15/582,877, filed on May 1, 2017, now Pat. No. 11,059,159, which is a (Continued)

(51) Int. Cl.
*B25F 5/00* (2006.01)
*B25B 21/00* (2006.01)
(Continued)

(52) U.S. Cl.
CPC .............. *B25F 5/001* (2013.01); *B25B 21/00* (2013.01); *B25B 21/02* (2013.01);
(Continued)

(58) Field of Classification Search
CPC . B25F 5/001; B25F 5/00; B25B 21/00; B25B 21/02; B25B 23/0035; B25B 23/147; B25B 23/1475; H01H 36/0073
(Continued)

(56) References Cited

U.S. PATENT DOCUMENTS 3,172,675 A 3/1965 Gonzalez
3,924,493 A 12/1975 Penner
(Continued)

FOREIGN PATENT DOCUMENTS

EP 2537639 A1 12/2012
FR 2520278 A1 7/1983
(Continued)

OTHER PUBLICATIONS

Majerus, Hubert—European Search Report—Jun. 10, 2014—6 pages—The Hague.
(Continued)

*Primary Examiner* — Anna K Kinsaul
*Assistant Examiner* — Mary C Hibbert-Copeland
(74) *Attorney, Agent, or Firm* — Scott B. Markow

(57) ABSTRACT

An actuator assembly for a power tool includes an actuator with a permanent magnet. The actuator is moveable between a first position for a first mode of operation, and a second position for a second mode of operation. A first positioning member is adjacent the first position composed of a ferromagnetic material to attract the permanent magnet. A second positioning member is adjacent the second position and composed of a ferromagnetic material to attract the permanent magnet. An electromagnet may be energized to move
(Continued)

the actuator between the first position and the second position. When the electromagnet is not energized and the actuator is in the first position, the actuator is retained in the first position. When the electromagnet is not energized and the actuator is in the second position, the actuator is retained in the second position. When the electromagnet is energized, the actuator moves between the first and second positions.

20 Claims, 21 Drawing Sheets

Related U.S. Application Data continuation of application No. 13/799,177, filed on Mar. 13, 2013, now abandoned, which is a continuation-in-part of application No. 13/494,325, filed on Jun. 12, 2012, now Pat. No. 9,364,942.

(60) Provisional application No. 61/500,872, filed on Jun. 24, 2011.

(51) Int. Cl.
*B25B 21/02* (2006.01)
*B25B 23/00* (2006.01)
*B25B 23/147* (2006.01)
*H01H 36/00* (2006.01)

(52) U.S. Cl.
CPC ........ *B25B 23/0035* (2013.01); *B25B 23/147* (2013.01); *B25B 23/1475* (2013.01); *B25F 5/00* (2013.01); *H01H 36/0073* (2013.01)

(58) Field of Classification Search
USPC .......................................................... 173/176
See application file for complete search history.

(56) References Cited

U.S. PATENT DOCUMENTS

| | | | | |
|---|---|---|---|---|
| 4,258,597 | A | 3/1981 | Gelman | |
| 4,285,254 | A | 8/1981 | Romeo | |
| 4,491,043 | A | 1/1985 | Dempsey et al. | |
| 4,768,405 | A | 9/1988 | Nickipuck | |
| 5,050,467 | A | 9/1991 | Brown et al. | |
| 5,526,460 | A | 6/1996 | DeFrancesco et al. | |
| 5,637,101 | A | 6/1997 | Shillington | |
| 6,062,112 | A | 5/2000 | Bonniot | |
| 6,672,183 | B2 | 1/2004 | Johnson | |
| 6,851,341 | B2 | 2/2005 | Winski et al. | |
| 6,883,402 | B2 | 4/2005 | Cerda | |
| 6,889,582 | B2 | 5/2005 | Wilhelm | |
| 6,938,526 | B2 | 9/2005 | Milbourne et al. | |
| 7,240,590 | B1 | 7/2007 | Lin | |
| 7,249,638 | B2 | 7/2007 | Bodine et al. | |
| 7,750,778 | B2 | 7/2010 | Fullerton et al. | |
| 11,059,159 | B2 * | 7/2021 | Puzio ........................ | B25F 5/00 |
| 2002/0152848 | A1 | 10/2002 | Johnson | |
| 2006/0124331 | A1 | 6/2006 | Stirm et al. | |
| 2006/0231051 | A1 | 10/2006 | Winstead et al. | |
| 2007/0186729 | A1 | 8/2007 | Baker | |
| 2009/0001722 | A1 | 1/2009 | Yoshihiro et al. | |
| 2009/0071671 | A1 * | 3/2009 | Zhong ................... | B25B 21/008 173/176 |
| 2010/0058896 | A1 | 3/2010 | Abel et al. | |

FOREIGN PATENT DOCUMENTS

| | | | |
|---|---|---|---|
| GB | 332379 | A | 7/1930 |
| GB | 701630 | A | 12/1953 |

OTHER PUBLICATIONS

Pothmann, Johannes—European Search Report—Jun. 28, 2016—6 pages—The Hague.
U.S. Appl. No. 15/582,877, filed May 1, 2017, Patented.
U.S. Appl. No. 13/799,177, filed Mar. 13, 2013, Abandoned.
U.S. Appl. No. 13/494,325, filed Jun. 12, 2012, Patented.

* cited by examiner

ELECTROMAGNETIC ACTUATOR FOR POWER TOOL

PRIORITY CLAIMS

This application claims priority under 35 U.S.C. § 120 as a continuation of U.S. patent application Ser. No. 15/582,877, filed May 1, 2017, which is a continuation of U.S. patent application Ser. No. 13/799,177, filed Mar. 13, 2013 (now abandoned), which is a continuation-in-part of U.S. patent application Ser. No. 13/494,325, filed Jun. 12, 2012 (now U.S. Pat. No. 9,364,942), which claims priority under 35 U.S.C. § 119(e) to U.S. Provisional Patent Application No. 61/500,872, filed Jun. 24, 2011. Each of the aforementioned patent applications is hereby incorporated by reference.

TECHNICAL FIELD

This application relates to an electromagnetic actuator assembly for changing a mode of operation of a power tool.

BACKGROUND

This section provides background information related to the present disclosure which is not necessarily prior art. There are various examples of power tools that include a mode change mechanism that is selectively movable to change a mode of operation of the power tool. Many such power tools include a user actuated mechanical button or switch positioned on the housing to selectively move the mode change mechanism. In other of these power tools, the mode change mechanism may be selectively moveable by another mechanical device in response to a tool condition, e.g., a spring that moves an actuator in response to an output torque.

U.S. Pat. No. 7,452,304, which is incorporated by reference, discloses a power tool with a multi-speed transmission that includes a plurality of planetary gear stages. One or more of the ring gears of the planetary gear transmission are selectively moveable by actuation of a mechanical switch on the housing to selectively engage different sets of planet gears and change the overall speed reduction ratio of the transmission.

U.S. Pat. No. 7,717,192, which is incorporated by reference, discloses a power tool with a selectively moveable collar that changes the mode of operation of the tool between a low speed mode, a high speed mode, and a hammer mode. Rotation of the collar causes movement of a shift pin to change the mode of operation.

U.S. Patent App. Pub. No. 2011/0152029, which is incorporated by reference, discloses a hybrid impact driver and drill with a selector that is selectively moveable to change between an impact mode and a drilling mode, as well as to change a speed setting of the transmission.

U.S. Patent App. Pub. No. 2012/0074658, which is incorporated by reference, discloses a power tool with a tool bit holder integrated into the power tool housing. The housing includes a button or rotational switch that is moveable to move a shifter between a first position that locks a tool bit in the holder, and a second position that enables release of the tool bit from the holder.

U.S. Patent App. Pub. No. 2012/0325509 (to which this application claims priority), which is incorporated by reference, discloses an impact wrench with a socket drive for receiving a socket wrench accessory. The socket drive includes a moveable retaining pin for selectively retaining and releasing the socket wrench accessory from the socket drive. The power tool includes a button or switch for selectively moving the retaining pin to retain the socket wrench accessory on the socket drive or to release the socket wrench accessory from the socket drive.

U.S. Pat. No. 8,347,750, which is incorporated by reference, discloses a power tool with a transmission that includes a radially expanding clutch assembly. The clutch assembly includes a shaft member that can receive an input torque and a gear member that can provide an output torque. The radially expanding clutch assembly also includes a clutch spring that selectively contains rolling members within longitudinal grooves in the shaft member. In the drive condition the rolling members are held in the grooves by the spring, and torque is transmitted from the shaft member to the gear member. In the clutch out condition, the spring expands, allowing the rolling members to move out of the grooves, which interrupts torque transmission from the shaft member to the gear member.

U.S. Pat. No. 7,452,304, which is incorporated by reference, discloses a power tool with a torque clutch having a clutch member that presses a spring against a pin that engages ramps on a face of one of the ring gears. When the output torque overcomes the spring force, the pin rides over the ramps, enabling the ring gear to rotate, which interrupts torque transmission from the transmission to the output shaft.

SUMMARY

In an aspect, a power tool includes a housing coupleble to a source of electric power, a motor disposed in the housing, an output shaft received at least partially in the housing, and a transmission in the housing and coupled to the motor and the output shaft for transmitting torque from the motor to the output shaft. A mode change mechanism has an actuator, a positioning member, and an electromagnet. The actuator includes a permanent magnet and is moveable between a first position for a first mode of operation of the power tool, and a second position a second, different mode of operation of the power tool. The positioning member and the electromagnet are configured to (i) retain the actuator in the first position when the electromagnet assembly is not energized and the actuator is in the first position, (ii) retain the actuator in the second position when the electromagnet assembly is not energized and the actuator is in the second position, and (iii) move the actuator from one of the first position and the second position to the other of the first position and the second position when the electromagnetic assembly is momentarily energized.

Implementations of this aspect may include one or more of the following features. The positioning member may include a second permanent magnet adjacent to the first position, and stationary relative to the actuator, wherein the actuator permanent magnet and the second permanent magnet are configured to attract when the actuator is in the first position and repel when the actuator is in the second position. The actuator permanent magnet and the second permanent magnet may each include an array of permanent magnets, with a portion of each array arranged to exert an attractive force between actuator permanent magnet and the second permanent magnet, and a remaining portion of each array of the permanent magnets arranged to exert a repulsive force between actuator permanent magnet and the second permanent magnet. The electromagnet may be momentarily energized by current flowing in a first direction to move the actuator from the first position to the second position, and can be momentarily energized by current flowing in a second opposite direction to move the actuator from the second position to the first position. A stop may prevent contact between the actuator and the positioning member when the actuator is in the first position.

The positioning member may include a first positioning member adjacent the first position and composed of a ferromagnetic material to attract the permanent magnet when the actuator is in the first position, and a second positioning member adjacent the second position and composed of a ferromagnetic material to attract the permanent magnet when the actuator is in the second position. The electromagnet may include a first electromagnet adjacent to the first position and a second electromagnet adjacent to the second position, such that when one of the first electromagnet and the second electromagnet is energized, the actuator moves from the first position to the second position, and when the other of the first electromagnet and the second electromagnet is energized, the actuator moves from the second position to the first position. A control circuit may be configured to control energization of the first and second electromagnets in response to an input condition, the input condition comprising one of a user selection of a desired power tool operating condition and a sensed power tool operating condition.

The actuator, the positioning member, and the electromagnet may comprise a portion of a clutch. The clutch may have an input member coupled to the transmission, an output member coupled to the output shaft, and a coupling device movable between a driving position in which torque is transmitted from the input member to the output member and a clutching position in which torque transmission from the input member to the output member is interrupted, and wherein when the actuator is in the first position. The actuator may retain the coupling member in the driving position, and when then actuator is in the second position, the actuator may allow the coupling member to move to the clutching position. The input member may have an input sleeve defining a radial bores, the output member may have an output cylinder received in the input sleeve defining a groove, the coupling member may have a drive ball received in the bore. The actuator may include a actuation sleeve received over the input sleeve, wherein when the actuation sleeve is in the first position, the ball is retained in the groove to transmit torque from the input sleeve to the output cylinder, and when the actuation sleeve is in the second position, the ball is permitted to escape the groove to interrupt torque transmission from the input sleeve to the output cylinder. The input member may include a ring gear of the transmission having a recess, the output member may have a portion of the output shaft, the actuator may have a sleeve, and the coupling member may have a leg extending from the sleeve. When the sleeve is in the first position, the leg may engage the recess to inhibit rotation of the ring gear, which enables torque transmission to the output member, and when the sleeve is in the second position, the leg does not engage the recess to allow rotation of the ring gear, which interrupts torque transmission to the output member.

The actuator, the positioning member and the electromagnet comprise a portion of a tool holder. The tool holder may be coupled to the output shaft for releasably retaining a power tool accessory. When the actuator is in the first position, the accessory is retained by the tool holder. When the actuator is in the second position the accessory is releasable from the tool holder. The tool holder may include a socket drive having a retractable retention pin and a linkage coupled to the retention pin for selectively retracting the retention pin. The actuator may include a ring configured to move the linkage and the retention pin between a retention position and a release position when the actuator is in the first position and the second position, respectively.

In another aspect, a mode change mechanism for a power tool includes an actuator that includes a permanent magnet and that is moveable between a first position for a first mode of operation of the power tool, and a second position a second, different mode of operation of the power tool. A first positioning member adjacent the first position is composed of a ferromagnetic material to attract the permanent magnet when the actuator is in the first position. A second positioning member adjacent the second position is composed of a ferromagnetic material to attract the permanent magnet when the actuator is in the second position. An electromagnet is configured to be energized to move the actuator between the first position and the second position, wherein (i) when the electromagnet is not energized and the actuator is in the first position. the actuator is retained in the first position, (ii) when the electromagnet is not energized and the actuator is in the second position, the actuator is retained in the second position, and (iii) when the electromagnet is energized, the actuator moves from one of the first and second positions to the other of the first and second positions.

Implementations of this aspect may include one or more of the following features. The electromagnet may include a first electromagnetic coil adjacent the first position, and a second electromagnetic coil adjacent the second position. The first electromagnetic coil may be energized to create a magnetic force to move the permanent magnet and the actuator away from the first positioning member to the second position, and the second electromagnetic coil may be energized to create a magnetic force to move the permanent magnet and the actuator away from second positioning member and to the first position. The electromagnet may be energized to cause current to flow in a first direction creating a magnetic force to move the permanent magnet and the actuator away from the first positioning member and to the second position, and the electromagnet may be energized to cause current to flow in a second opposite direction creating a magnetic force to move the permanent magnet and the actuator away from the second positioning member and to the first position. A first stop may prevent contact between the actuator and the first positioning member when in the first position, and a second stop may prevent contact between the actuator and the second positioning member when in the second position.

In another aspect, a method of operating a mode change mechanism of a power tool includes the following. It is determined whether the power tool should be operating in a first mode of operation or a second mode of operation. It is determined whether an actuator that includes a permanent magnet is in a first position that causes the power tool to operate in the first mode of operation or a second position that causes the power tool to operation in the second mode of operation. An electromagnet is energized to cause the actuator and the permanent magnet to move between the first position and the second position if the actuator is in the first position and the power tool should be operating in the second mode of operation, or if the actuator is in the second position and the power tool should be operating in the first mode of operation. The actuator is retained, without energizing the electromagnet, in the first position if the actuator is in the first position and the power tool should be operating in the first mode of operation, or in the second position if the actuator is in the second position and the power tool should be operating in the second mode of operation.

Implementations of this aspect may include one or more of the following features. Retaining the actuator may include providing a first ferromagnetic positioning member adjacent the first position to attract the permanent magnet when the actuator is in the first position, and providing a second ferromagnetic positioning member adjacent the second position to attract the permanent magnet when the actuator is in the second position. Energizing the electromagnet may include energizing a first electromagnetic coil adjacent the first position to create a magnetic force that moves the permanent magnet and the actuator away from the first position to the second position when the actuator is in the first position and should be in the second position, and energizing a second electromagnetic coil adjacent the second position to create a magnetic force that moves the permanent magnet and the actuator away from the second position to the first position when the actuator is in the second position and should be in the first position. Energizing the electromagnet may include causing current to flow through the electromagnet in a first direction to create a magnetic force that moves the permanent magnet and the actuator away from the first position to the second position when the actuator is in the first position and should be in the second position, and causing current to flow through the electromagnet in a second opposite direction to create a magnetic force that moves the permanent magnet and the actuator away from the second position to the first position when the actuator is in the second position and should be in the first position.

Advantages may include one or more of the following. The mode change mechanism can be moved by applying a brief impulse of electrical energy. In this way, the user actuated switch or button may be replaced with an electronic switch and may be positioned on the tool housing at virtually any location. Alternatively, the user actuated switch could be replaced with an automated circuit for determining when to move the actuator based on one or more input conditions (e.g., proximity to workpiece, output torque, current delivered to motor, etc.). Also, heavy mechanical switches can be eliminated which may reduce the overall size, weight, and complexity of the power tool. These and other advantages and features will be apparent from the description, the drawings, and the claims.

DETAILED DESCRIPTION

Figure 1:
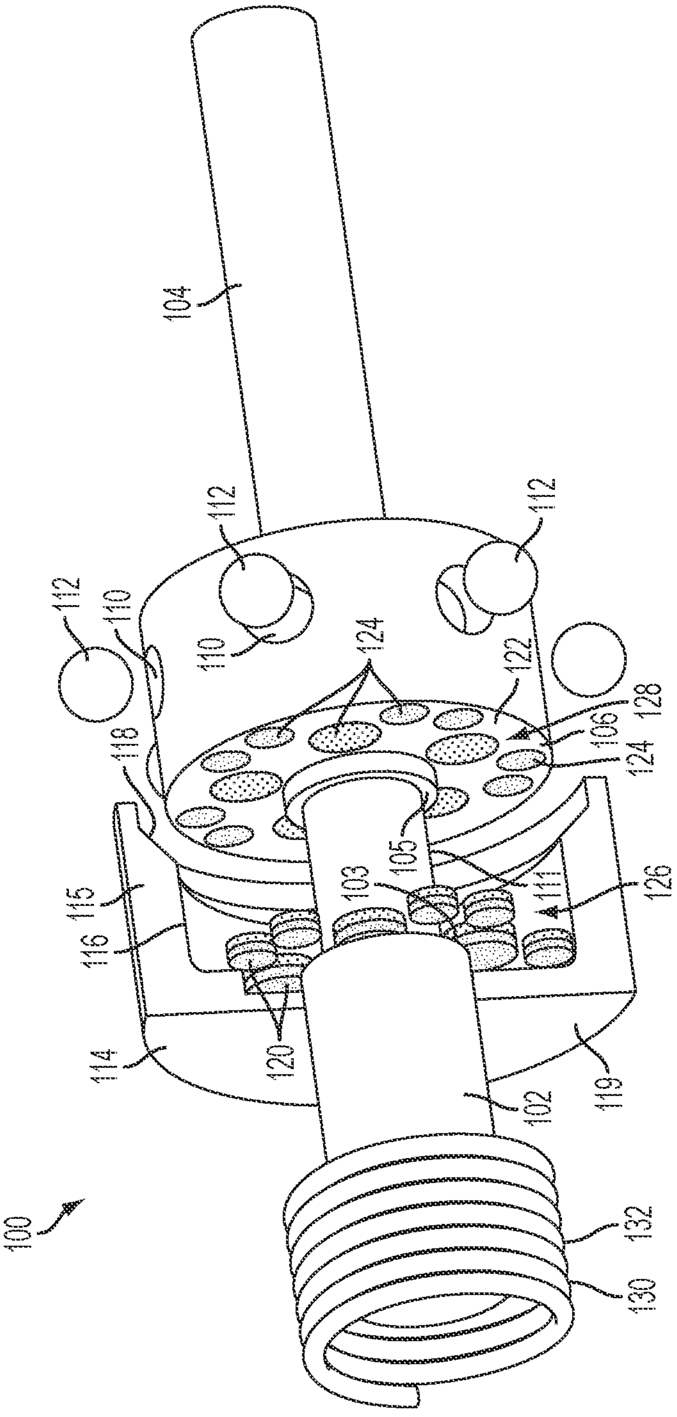
FIG. 1 is an exploded perspective view of a first embodiment of a power tool mode change mechanism.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
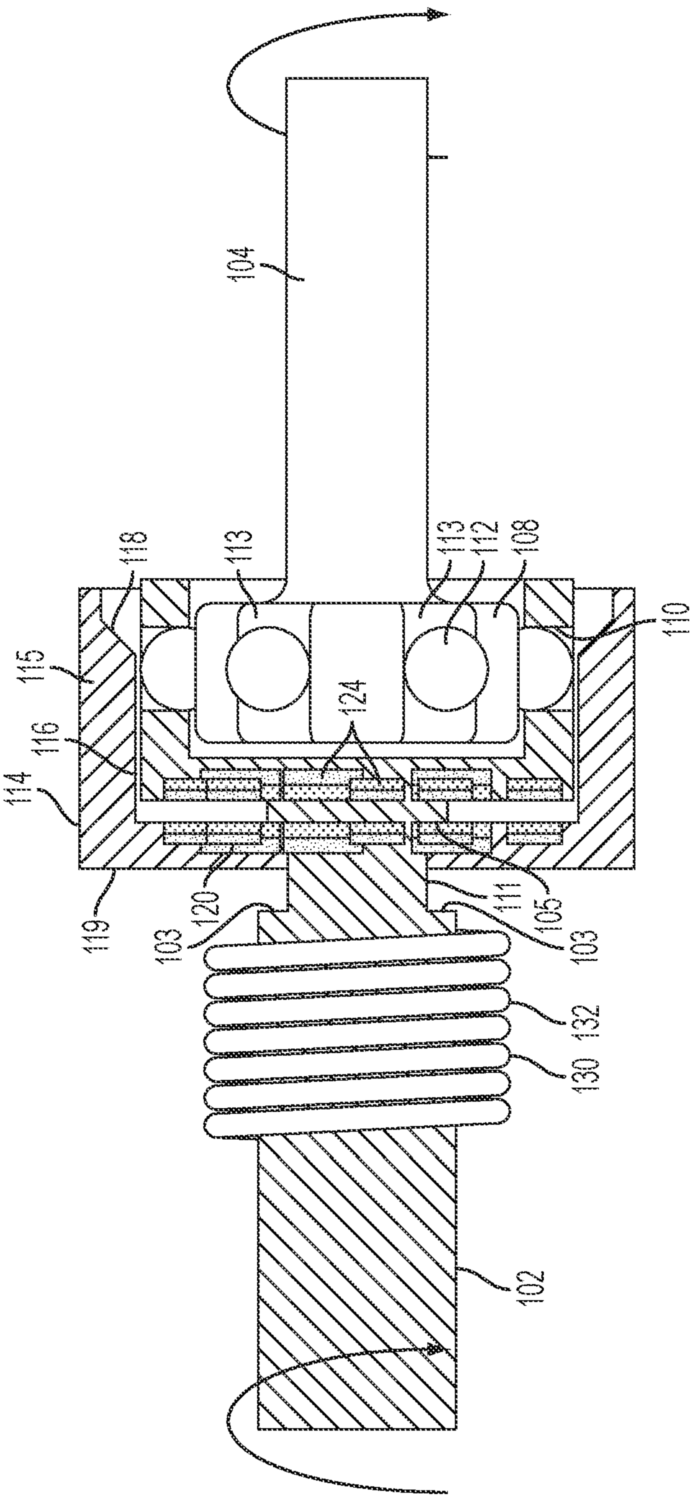
FIG. 2 is a partial cross-sectional view of the mode change mechanism of FIG. 1 in a first mode of operation.
Figure 3:
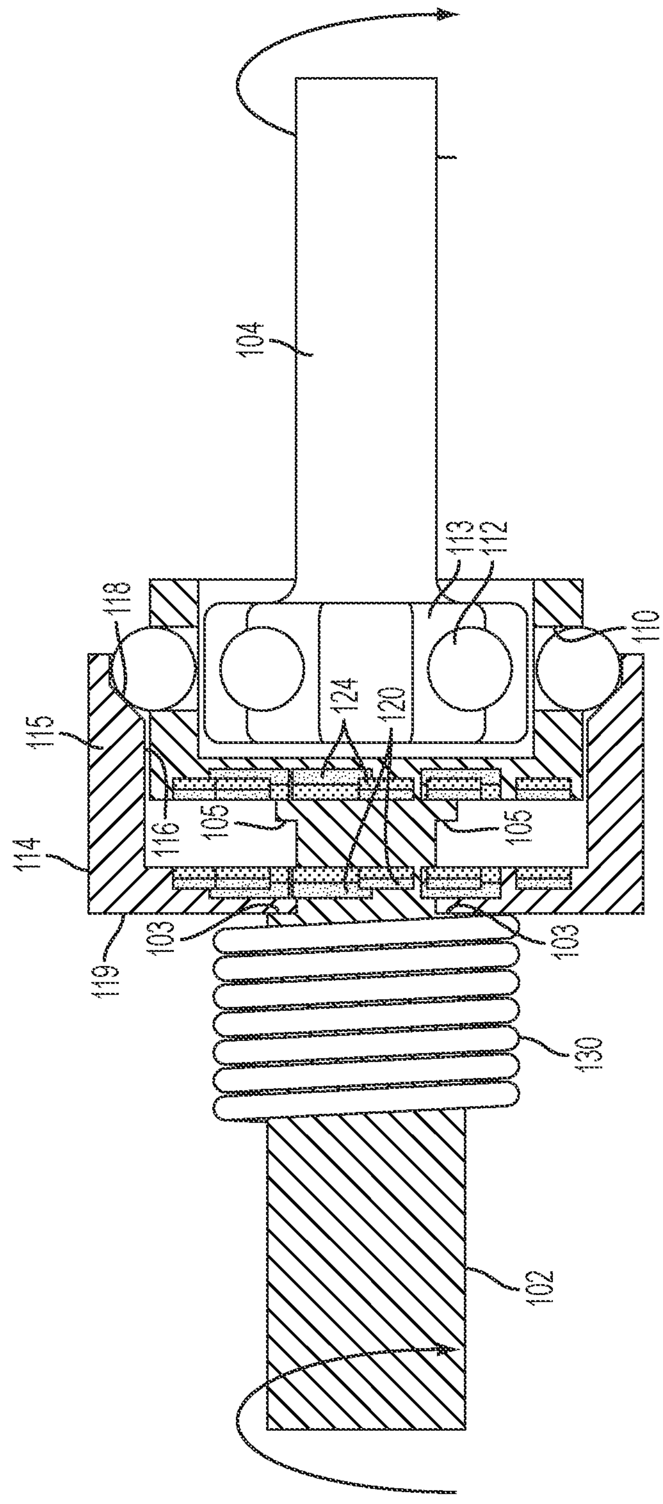
FIG. 3 is a partial cross-sectional view of the mode change mechanism of FIG. 1 in a second mode of operation.

Referring to FIGS. 1-3, in an embodiment, a mode change mechanism in the form of an electromagnetic clutch assembly 100 may replace the radially expanding clutch assembly in the power tool disclosed in the above-referenced U.S. Pat. No. 8,347,750. The clutch assembly 100 includes an input shaft 102 and an output shaft 104. The input shaft 102 is fixedly attached to a positioning member in the form of a hollow input sleeve 106. The output shaft 104 is fixedly attached to an output cylinder 108 that is received inside the input sleeve 106. The input sleeve includes a plurality of radial bores 110 that receive a plurality of drive balls 112. The output cylinder 108 have a plurality of longitudinal grooves 113 that receive the drive balls 114. The input sleeve 106 has a reduced diameter portion 111 with a rear shoulder 103 and a front shoulder 105. Received over the reduced diameter portion 111 of the input shaft 102 and over the input sleeve 106 is an actuator in the form of an actuation sleeve 114. The actuation sleeve 114 has a base wall 119 and a cylindrical wall 115 with an internal surface having a first substantially flat portion 116 and a second ramped portion 118.

The actuation sleeve 114 is selectively moveable between a first position for a first mode of operation (FIG. 2) where the base wall 119 abuts the front shoulder 105 and the flat portion 116 engages the balls 112 to retain the balls in the grooves 113 of the output cylinder 108, and a second position for a second mode of operation (FIG. 3) where the base wall 119 abuts the rear shoulder 103 and the ramped portion 118 engages the balls 112 to allow the balls to escape the grooves 113 of the output cylinder 108. In the first mode of operation, when the balls 112 are retained in the grooves 113, torque is transmitted from the input shaft 102 to the output shaft 104. In the second mode of operation, when the balls 112 escape the grooves 113, torque transmission from the input shaft 102 to the output shaft 104 is interrupted.

To facilitate moving the actuation sleeve 114 between the first position and the second position, the actuation sleeve 114 has a base wall 119 that includes a first plurality of magnets 120 arranged in a first array 126. The input sleeve 106 also has a base wall 122 with a second plurality of magnets 124 arranged in a second array 128. Some opposing pairs of magnets from the first array 126 and the second array 128 are arranged with opposite poles facing one another (i.e., north facing south or south facing north) so that they are configured to attract one another. Other opposing pairs of magnets from the first array 126 and the second array 128 are arranged with the same poles facing one another (i.e., north facing north or south facing south) so that they are configured to repel one another. Such magnet arrays enable the magnet arrays to have varying attractive and repulsive properties depending on the relative distance and positions of the magnet arrays. Similar magnet arrays may also be known as coded patterns of magnetic elements or correlated magnets. Similar magnet arrays are described, e.g., in U.S. Pat. No. 7,750,778, which is incorporated by reference, and are sold by Correlated Magnetics Research, located in New Hope, Alabama.

Figure 4:
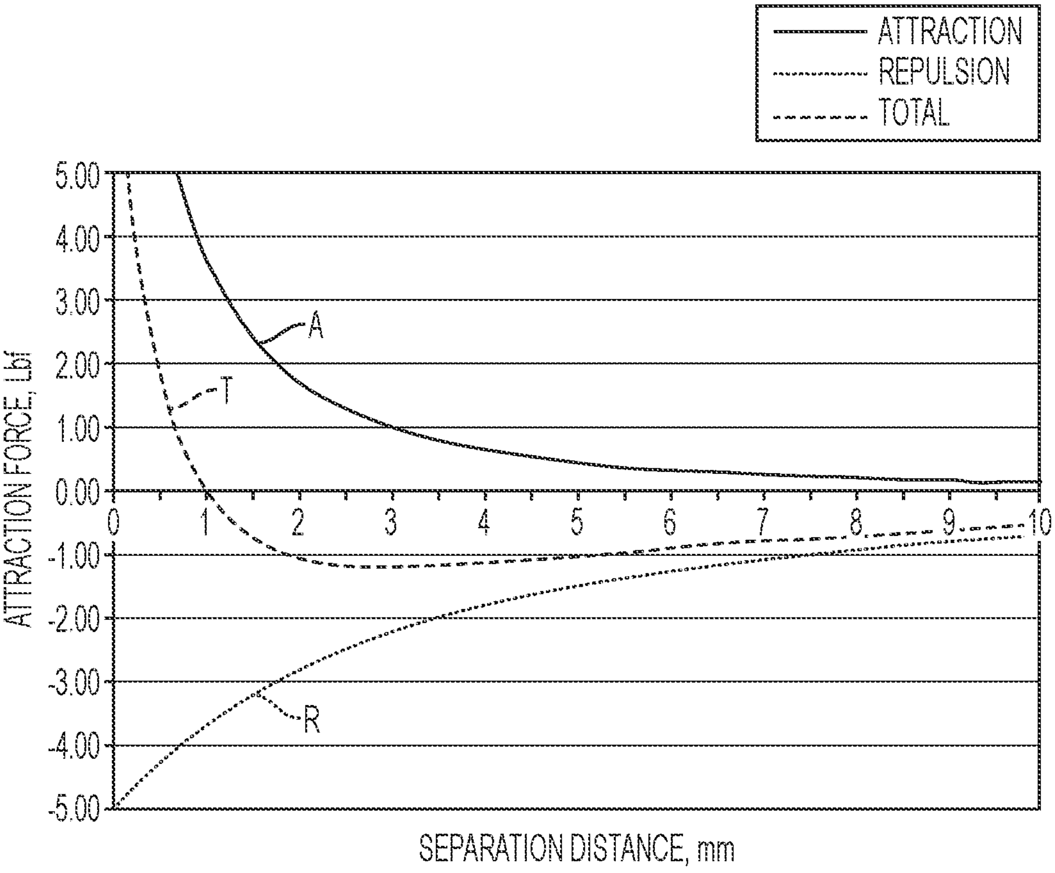
FIG. 4 is a graphical representation of the magnetic forces of components of the mode change mechanism of FIG. 1.

Referring also to FIG. 4, the first magnet array 126 and the second magnet array 128 are configured so that the sum of the attractive force of the magnets arranged to attract one another and the repulsive force of the magnets arranged to repel one another varies according to the separation distance between the first array 126 and the second array 128. FIG. 4 illustrates the attractive force vs. separation distance for the magnets arranged to attract (curve A), the repulsive force vs. separation distance for the magnets arranged to repel (curve R), and the net attractive or repulsive force of all of the magnets vs. distance (curve T). The net force is strongly positive (attractive) when the separation distance is less than a predetermined threshold (e.g., 1 mm), and the net force is weakly negative (repulsive) when the separation distance is greater than the predetermined threshold.

The clutch assembly 100 also has an electromagnet 130 in the form of a coil of wire 132 wrapped around a portion of the input shaft 102 adjacent to the actuation sleeve 114. When the actuation sleeve is in the second position (FIG. 3), the electromagnet 130 can be energized by driving current in a first direction, which generates a magnetic field that repels the first array 126 of magnets with a force greater than the repulsive force between the first array 126 and second array 128 of magnets. This tends to push the actuation sleeve 114 to the first position (FIG. 2). When the actuation sleeve is in the first position (FIG. 2), the electromagnet 130 can be energized by driving current in a second opposite direction, which generates a magnetic field that attracts the first array of magnets 126 with a force greater than the attractive force between the first array 126 and the second array 128. This tends to pull the actuation sleeve to the second position (FIG. 3).

Figure 5:
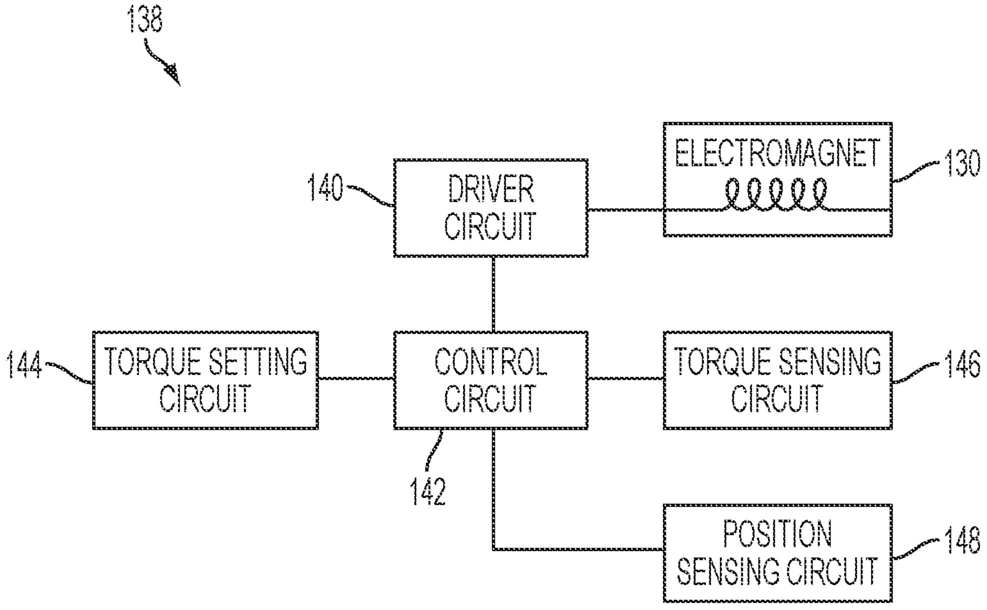
FIG. 5 is a schematic representation of an electronics module of the mode change mechanism of FIG. 1.

Referring also to FIG. 5, the electromagnet 130 may be coupled to an electronics module 138 that includes a driver circuit 140 (e.g., an H-bridge circuit) configured to drive the electromagnet 130. The driver circuit 140 may be connected to the output of a control circuit 142 (e.g., a microprocessor or controller). The control circuit 142 may receive an input from a torque setting circuit 144 (e.g., from a user input and/or from a pre-programmed memory device)) that generates a signal corresponding to a desired torque setting. The control circuit 142 may also receive an input from a torque sensing circuit 146 that generates a signal that corresponds to the amount of output torque on the tool. The torque sensing circuit may include one or more of a current sensor, a position sensor, a torque transducer, a force sensor, etc. In one possible embodiment, the torque sensing circuit is similar to the electronic clutch circuit described in commonly owned U.S. patent application Ser. No. 13/798,210, filed Mar. 13, 2013, which is incorporated by reference. In addition, the control circuit may receive an input signal from a position sensing circuit 148, which corresponds the current position of the actuation sleeve 118 (e.g., via a Hall effect sensor or a membrane potentiometer). The controller processes the torque setting input signal, the torque sensing input signal, and the position sensing input signal to determine when and in which direction to cause the drive circuit to energize the electromagnet to change the position of the actuation sleeve 118.

Figure 6:
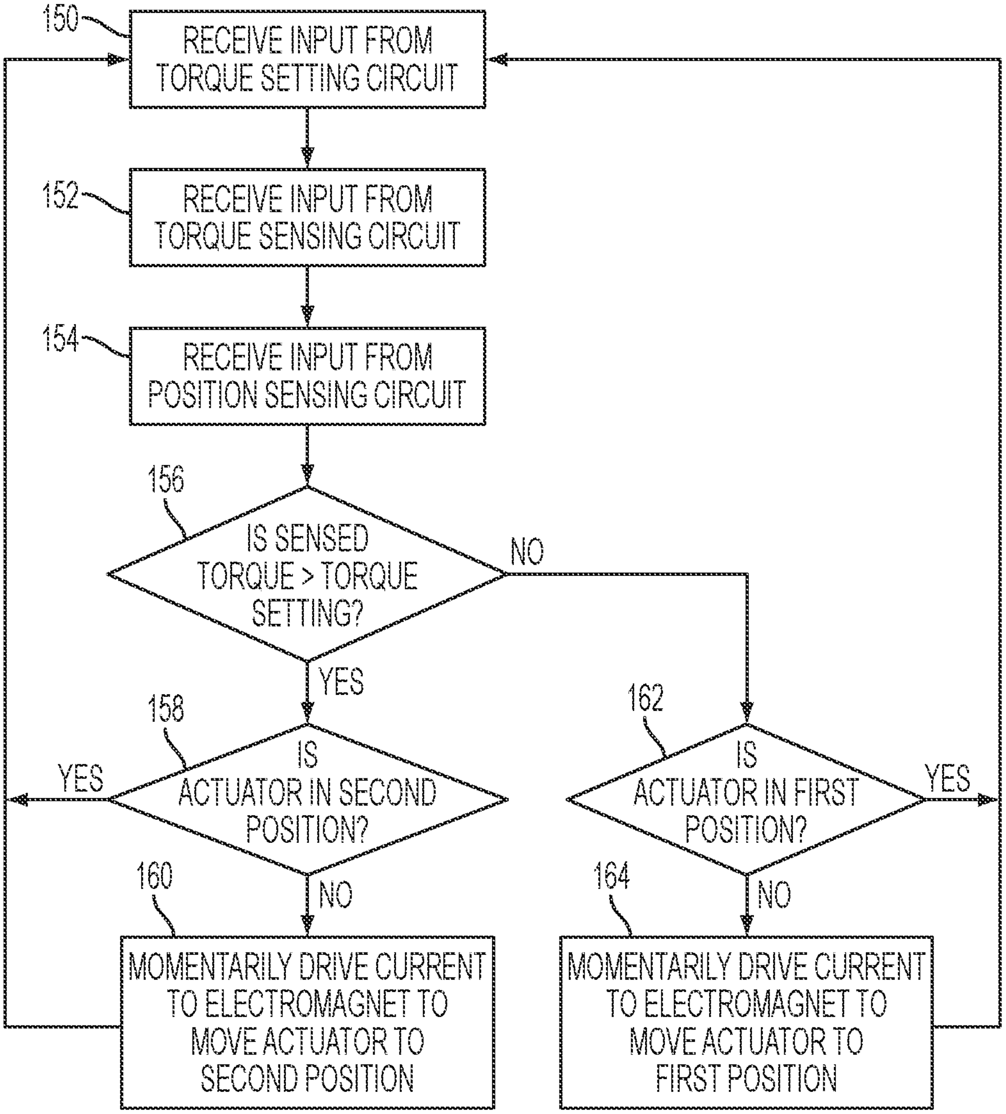
FIG. 6 is a flow chart illustrating the operation of the mode change mechanism of FIG. 1.

Referring also to FIG. 6, in use, first, at step 150, the control circuit receives an input signal from the torque setting circuit that corresponds to the desired torque setting. At step 152, the control circuit receives an input signal from the torque sensing circuit that indicates the output torque. At step 154, the control circuit receives an input signal from the position sensing circuit that indicates whether the actuation sleeve 118 is in the first position or the second position. At step 156, the control circuit determines whether the sensed torque has exceeded the desired threshold torque, which indicates that torque transmission should be interrupted. If YES, then at step 158, the control circuit determines whether the actuator is already in the second position (FIG. 3), in which torque transmission is interrupted. If YES, then control circuit returns to step 150. If NO, then the control circuit causes the drive circuit to momentarily drive the electromagnet to attract the actuator from the first position to the second position to interrupt torque transmission. Once the actuator is in the second position, current need not be delivered to the electromagnetic coil to keep the actuator in the second position, as the repulsive force between the first and second magnet arrays will keep the actuator in the second position. By requiring only a momentary burst of current, this saves energy and drain on a battery (if a cordless tool).

If at step 156, the control circuit determines that the sensed torque does not exceed the torque setting, this indicates that torque transmission should be permitted. Next, at step 158, the control circuit determines whether the actuator is already in the first position (FIG. 2), in which torque transmission is permitted. If YES, then control circuit returns to step 150. If NO, then the control circuit causes the drive circuit to momentarily drive the electromagnet to repel the actuator away from the second position to the first position to allow torque transmission. Once the actuator is in the first position, current need not be delivered to the electromagnetic coil to keep the in the second position, as the attractive force between the first and second magnet arrays will keep the actuatorin the second position. By requiring only a momentary burst of current, this saves energy and drain on a battery (if a cordless tool).

Figure 7:
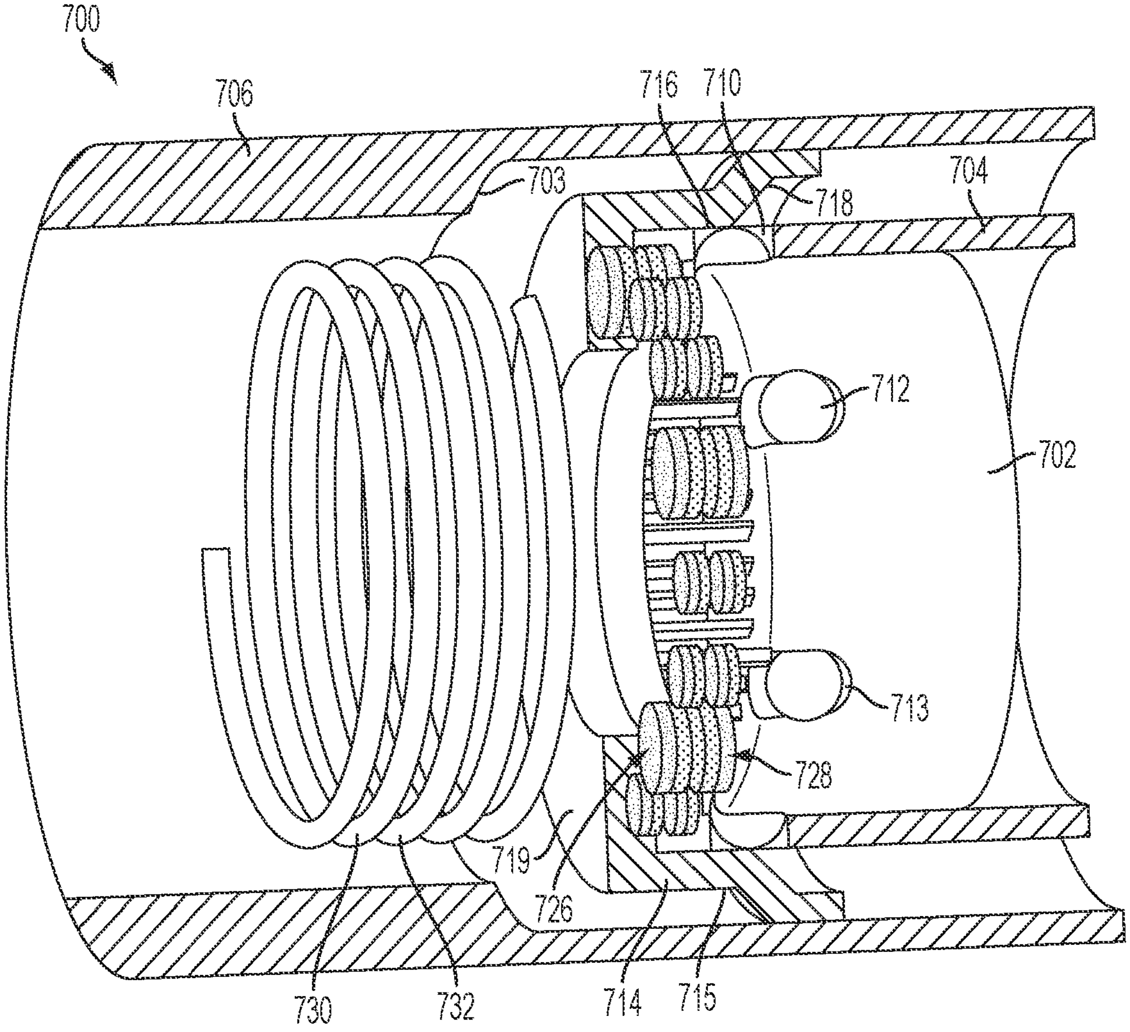
FIG. 7 is a perspective view, partially in section, of a second embodiment of a power tool mode change mechanism.
Figure 8:
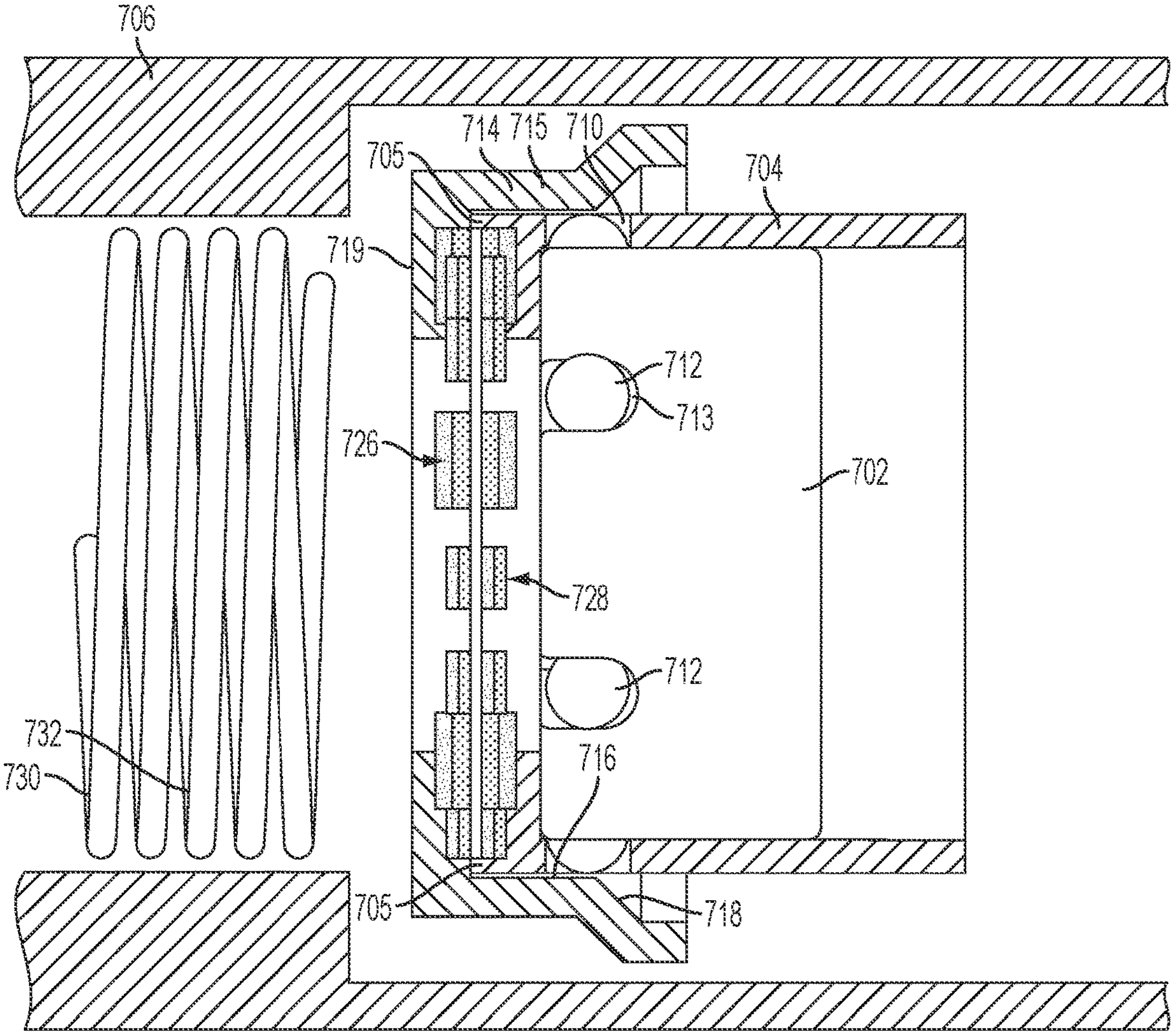
FIG. 8 is a partial cross-sectional view of the mode change mechanism of FIG. 7 in a first mode of operation.
Figure 9:
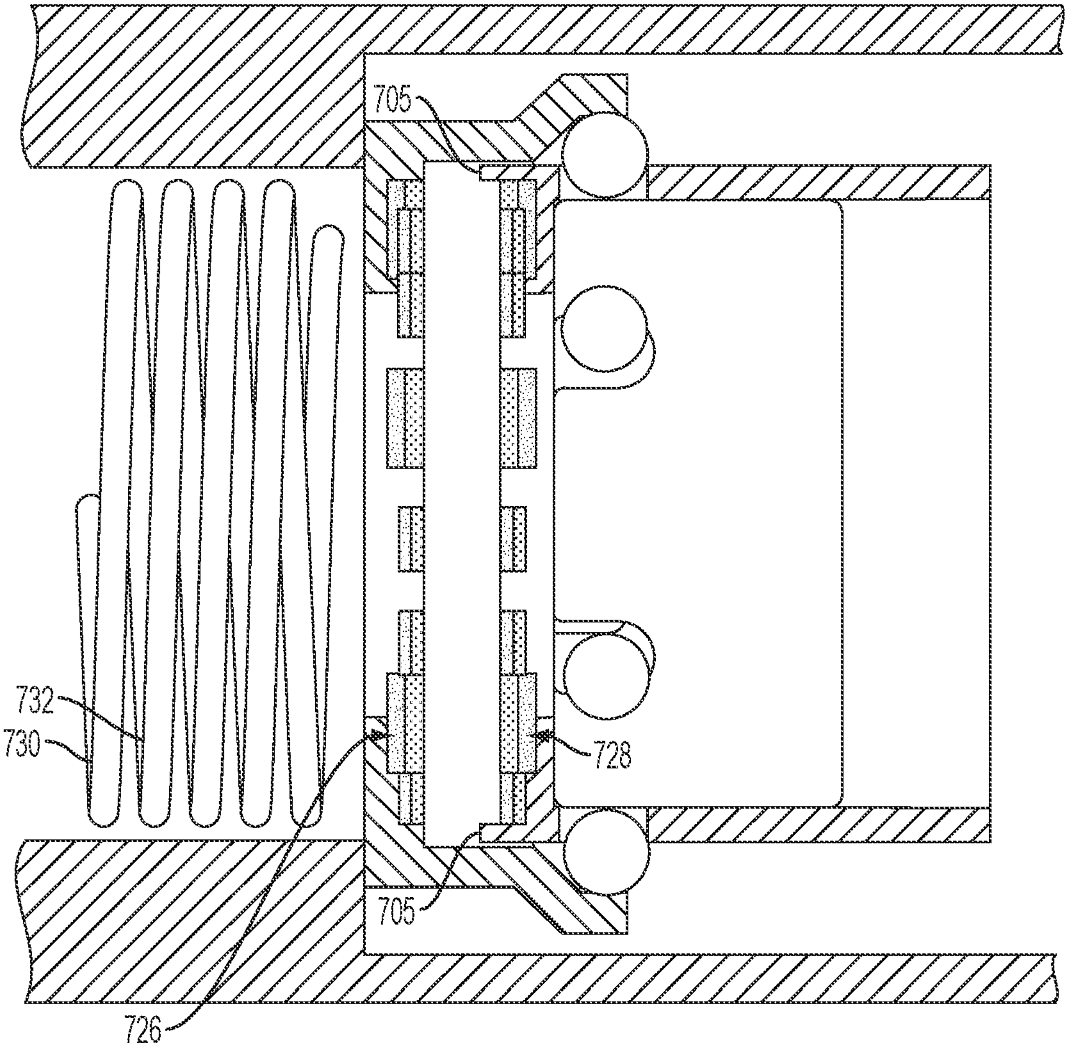
FIG. 9 is a partial cross-sectional view of the mode change mechanism of FIG. 7 in a second mode of operation.

Referring to FIGS. 7-9, in another embodiment, a mode change mechanism in the form of an electromagnetic clutch assembly 700 may replace the torque clutch assembly in the power tool disclosed in the above-referenced U.S. Pat. No. 7,452,304. The clutch assembly 700 includes a ring gear 702 of the planetary transmission, and a positioning member in the form of a generally cylindrical transmission housing 704. The transmission housing 704 receives the ring gear 702 and other gears of the planetary gear transmission (not shown), and is fixedly received in a tool housing 706. The transmission housing 704 includes a plurality of radial bores 710 that receive a plurality of drive balls 712. The ring gear 702 has a plurality of longitudinal grooves 713 that receive the drive balls 712. Received at least partially over the ring gear 702 is an actuator in the form of an actuation sleeve 714. The actuation sleeve 714 has a base wall 719 and a cylindrical wall 715 with an internal surface having a first substantially flat portion 716 and a second ramped portion 718. The tool housing 706 has a rear internal shoulder 703. The transmission housing 704 has a front internal shoulder 705.

The actuation sleeve 714 is selectively moveable between a first position (FIG. 8) where the base wall 719 abuts the front shoulder 705 and the flat portion 716 engages the balls 712 to retain the balls in the grooves 714 of the ring gear 702, and a second position (FIG. 9) where the base wall 719 abuts the rear shoulder 703 and the ramped portion 718 engages the balls 712 to allow the balls to escape the grooves 714 of the ring gear 702. In the first position (FIG. 8), when the balls 712 are retained in the grooves 714, the ring gear 702 is not permitted to rotate relative to the transmission housing 704, which allows torque to be transmitted from the transmission to an output shaft (not shown), as will be understood to those of ordinary skill in the art. In the second position (FIG. 9), when the balls 712 escape the grooves 714, and the ring gear 702 is permitted to rotate freely relative to the transmission housing 704, which interrupts torque transmission from the transmission to the output shaft, as will be understood to those of ordinary skill in the art.

To facilitate moving the actuation sleeve 714 between the first position and the second position, the actuation sleeve 714 has a base wall 719 that includes a first array of magnets 726, and the transmission housing 704 has a second array of magnets 728 that are arranged similarly to the first array of magnets 126 and the second array of magnets 128 described above with respect to FIGS. 1-4. Therefore, the first magnet array 726 and the second magnet array 728 are configured so that the net magnetic force is strongly positive (attractive) when the separation distance is less than a predetermined threshold (e.g., 1 mm), and the net magnetic force is weakly negative (repulsive) when the separation distance is greater than the predetermined threshold.

The clutch assembly 700 also has an electromagnet 730 in the form of a coil of wire 732 adjacent to the actuation sleeve 714, similar to the electromagnet 130 described above with respect to FIGS. 1-4. Thus, when the actuation sleeve is in the second position (FIG. 9), the electromagnet 730 can be momentarily energized by driving current in a first direction, to push the actuation sleeve 714 to the first position (FIG. 8). When the actuation sleeve is in the first position (FIG. 8), the electromagnet 730 can be momentarily energized by driving current in a second opposite direction, to pull the actuation sleeve 714 to the second position (FIG. 9). The electromagnet 730 may be coupled to a similar electronics module as the electronics module 138 illustrated in FIG. 5 and described above. The clutch assembly 700 may be operated according to the method illustrated in FIG. 6 and described above.

Alternatively, it is known, e.g. from the aforementioned U.S. Pat. No. 7,452,304 and related art, that the speed reduction ratio of a multi-speed planetary transmission may be changed by selectively preventing rotation of one or more of the ring gears (which results in a greater speed reduction) or allowing rotation of one or more of the ring gears (which results in a lesser speed reduction). Therefore, the clutch assembly 700 could instead be connected to a controller that receives an input of a speed setting signal that corresponds to a desired speed setting of the tool. When the speed setting signal changes, indicating that the desired speed reduction ratio has changed, the electromagnet 730 can be driven to move the actuation sleeve 714 to either the first or second position to change the speed reduction ratio of the transmission accordingly.

Figure 10:
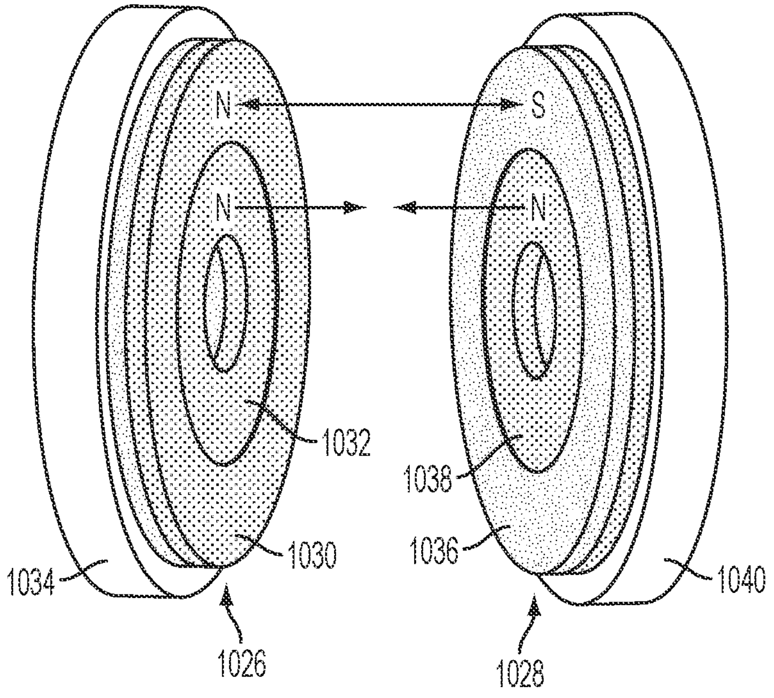
FIG. 10 is a perspective view of some of the components of a third embodiment of a mode change mechanism of a power tool.
Figure 11:
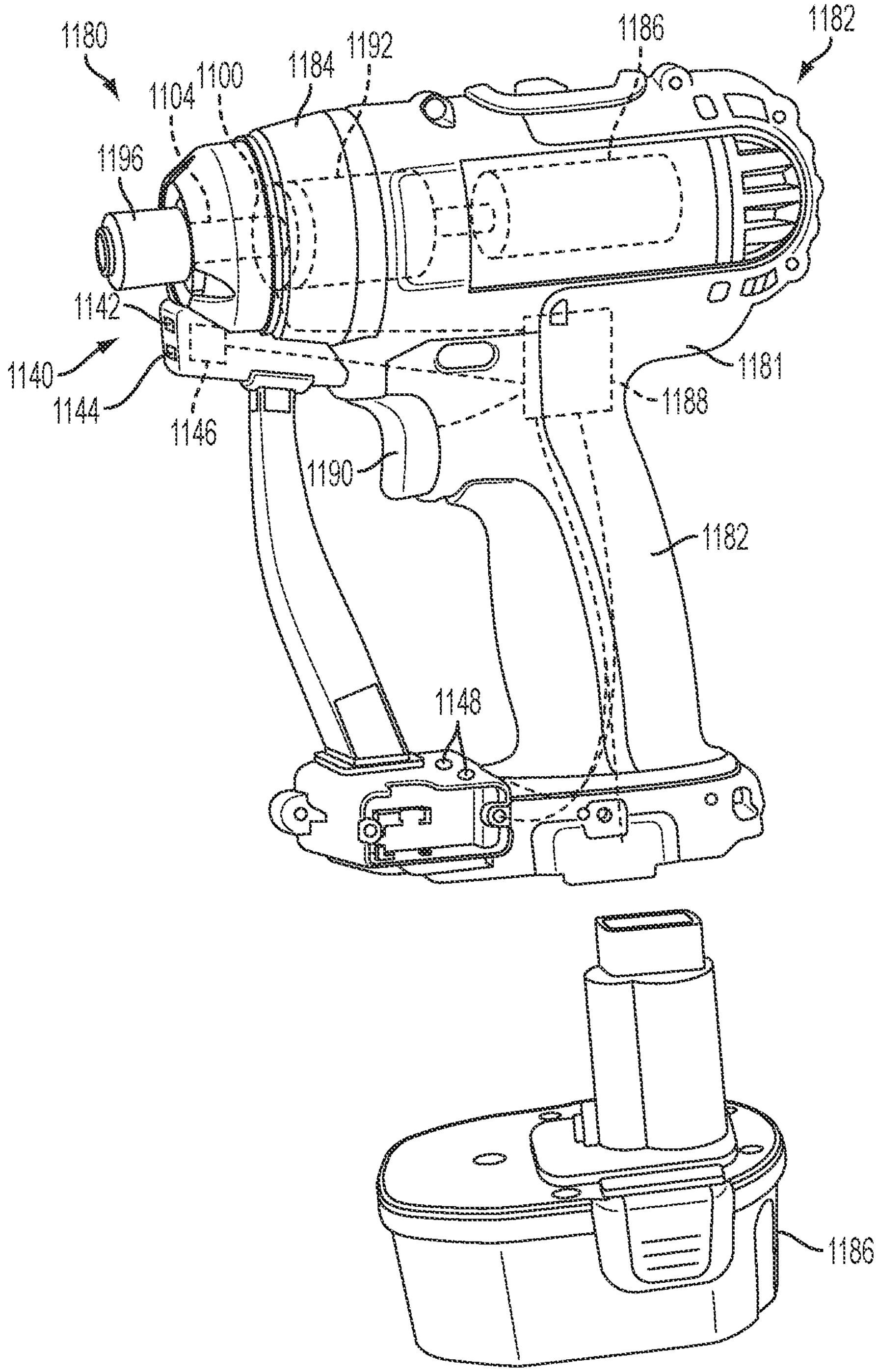
FIG. 11 is a perspective view of a power tool having a fourth embodiment of a mode change mechanism.

Referring to FIG. 10, in the above mode change mechanisms 100, 700, or in any other power tool mode change mechanisms, an actuator 1020 may be moveable between first and second positions and a positioning member 1022 may remain stationary relative to the actuation 1020. The actuator 1020 may have a first magnet array 1026 (which is a substitute for the above-described magnet arrays 126, 726) and the positioning member 1022 may have a second magnet array 1028 (which is a substitute for the above-described magnet arrays 128, 728). The first magnet array 1026 includes a first inner ring magnet 1032 and a first outer ring magnet 1030 concentrically mounted on a first non-magnetic backer plate 1034. Both the first inner and first outer ring magnets 1032, 1030 are arranged with their north poles facing toward the second magnet array 1028. The second magnet array 1028 includes a second inner ring magnet 1038 and a second outer ring magnet 1036 concentrically mounted on a second non-magnetic backer plate 1040. The second outer ring magnet 1036 is arranged with its south pole facing the north pole of the first outer ring magnet 1030 so as to provide an attractive force. The second inner ring magnet 1038 is arranged with its north pole facing the north pole of the first inner ring magnet 1032 so as to provide a repulsive force. The first and second ring magnet arrays 1026, 1028 together provide a net force vs. separation distance profile as the profile shown in FIG. 4. Thus, the actuator 1020 and the positioning member 1022 may be used in conjunction with an electromagnet (not shown) in the manner discussed above with respect to FIGS. 1-9 to enable movement of the actuator between the first and second positions for first and second modes of operation when the electromagnet is energized, and allows the actuator to be retained in one of the first and second positions when the electromagnet is not energized.

Referring to FIGS. 11-14, in another embodiment, a power tool such as a drill/driver 1180 includes a mode change mechanism in the form of an electromagnetic clutch assembly 1100. The power tool 1180 includes a housing 1182 having a motor housing 1181, a handle 1182 extending downward from the motor housing 1181, and a transmission housing 1184 coupled to a front end of the motor housing 1181. The handle 1182 is coupleable to a removable battery pack 1186, although it should be understood that the battery could be integral, or the housing could be coupled to an alternative source of electrical power such as an AC power source. Disposed in the motor housing 1181 is a motor 1186 and a control circuit 1188, which in turn is coupled to the battery pack 1186 and to a trigger switch 1190 disposed on the housing 1182. The motor 1186 is coupled to a transmission 1192, which transmits torque from the motor 1186 to a spindle 1194. The spindle 1194 is coupled to a tool bit holder 1196 extending from the housing for removably retaining a tool bit such as a screwdriver bit. In use, actuation of the trigger switch 1190 causes the controller to deliver electrical power to the motor 1186, which in turn drives the transmission 1192, the spindle 1104, and the tool bit holder 1196.

Figure 12:
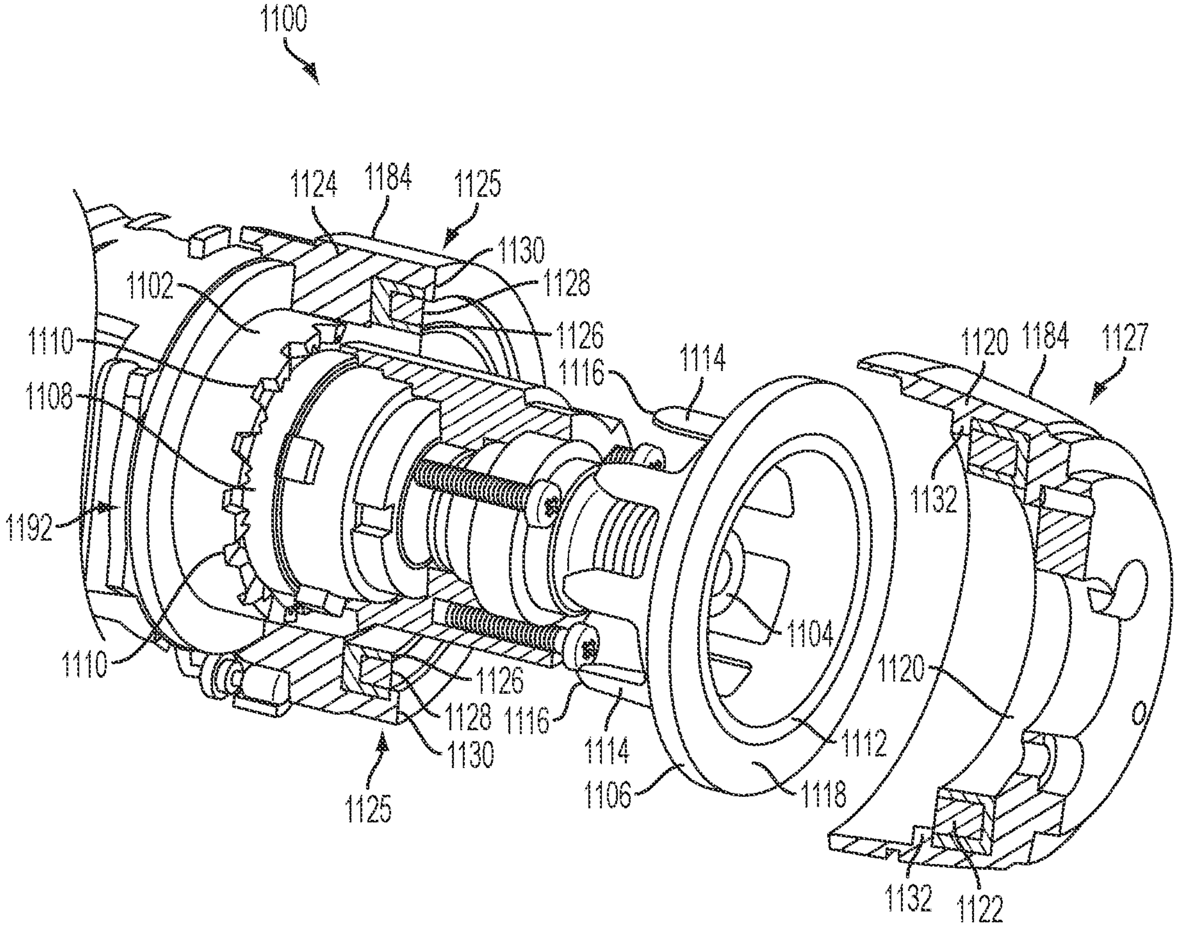
FIG. 12 is an exploded perspective view of the fourth embodiment of the mode change mechanism for the power tool of FIG. 11.
Figure 13:
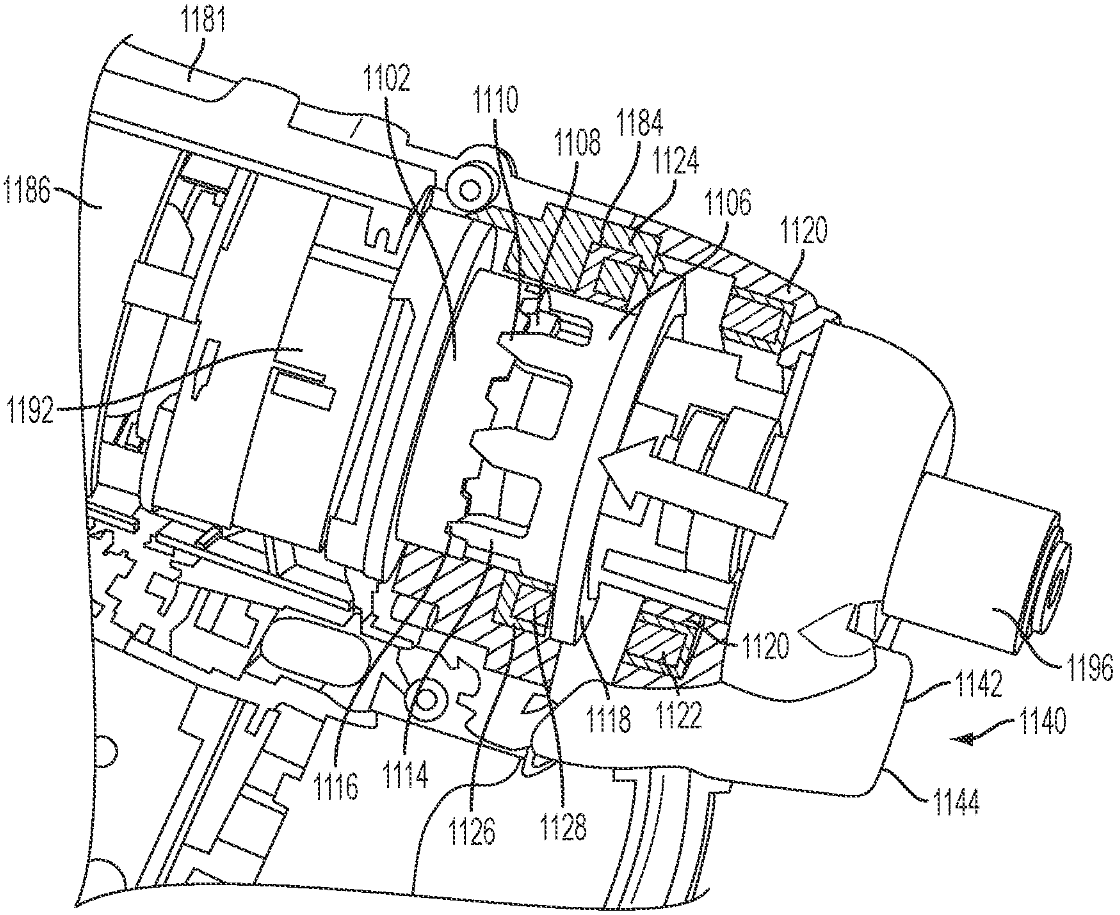
FIG. 13 is a partial cross-sectional view of the power tool and mode change mechanism of FIGS. 12 and 13 in a first mode of operation.
Figure 14:
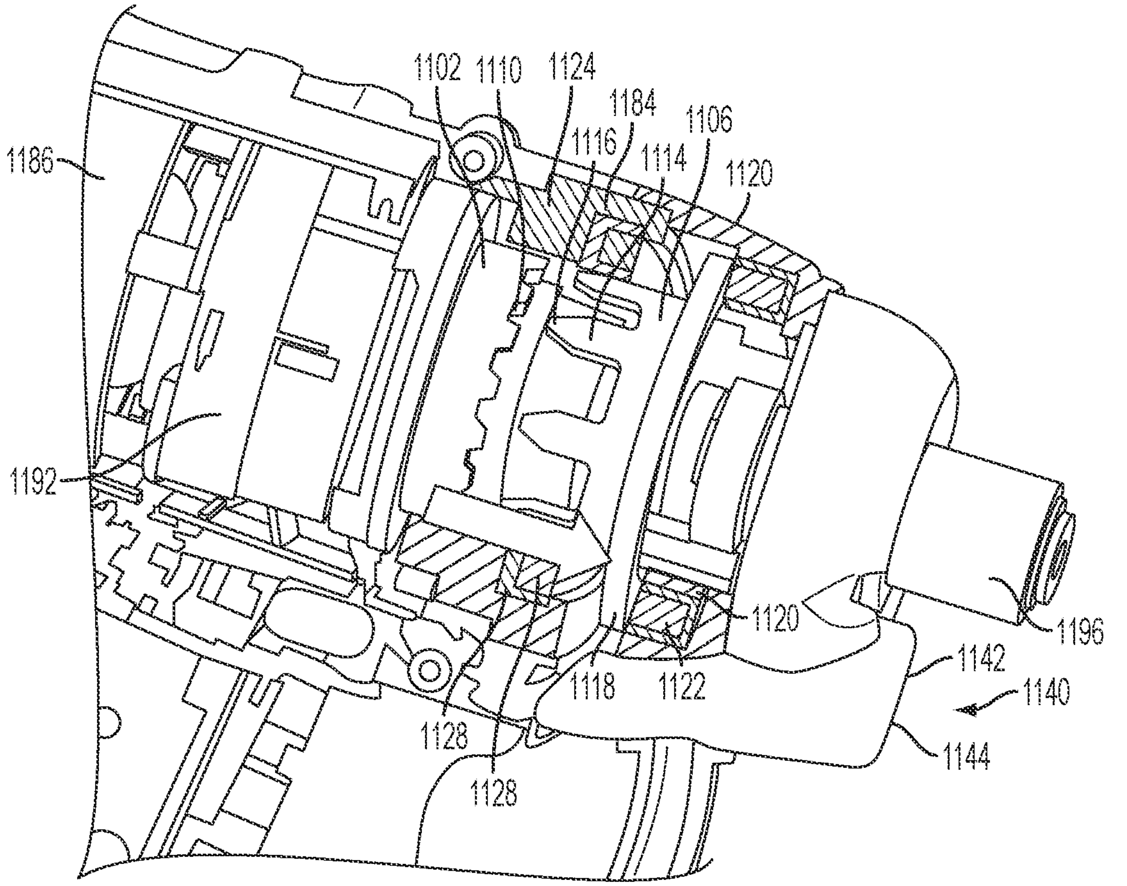
FIG. 14 is a partial cross-sectional view of the power tool and mode change mechanism of FIGS. 12 and 13 in a second mode of operation.

Referring to FIGS. 12-14, the electromagnetic clutch assembly 1100 includes an output stage ring gear 1102 of the transmission 1192, the output spindle 1104, and an axially moveable actuator in the form of an actuator sleeve 1106. The ring gear meshes with a plurality of planet gears (not shown) which are carried by an output stage planet carrier 1108. The carrier 1108 is non-rotationally coupled with the output spindle 1104. The planet gears also mesh with an input sun gear (not shown) that extends from the motor or from a previous stage of the transmission. When the ring gear 1102 is held stationary or grounded relative to the transmission housing 1184, rotation of the sun gear causes the planet gears to orbit the sun gear, which causes the planet carrier 1108 to rotate and drive the output spindle 1104 in rotation. When the ring gear 1102 is not grounded or allowed to rotate relative to the housing, rotation of the sun gear causes the planet gears to spin on their axis but not to orbit the sun gear, so that the carrier 1108, and thus, the spindle 1104 do not rotate. Therefore, selectively grounding the ring gear 1102 acts as a clutch which prevents torque transmission when the ring gear 1102 is not grounded, and allows torque transmission when the ring gear 1102 is grounded.

The ring gear 1102 includes a plurality of axial slots 1110 facing the actuator sleeve 1106. The actuator sleeve 1106 has a ring portion 1112, and a plurality of legs 1114 extending axially from the actuator sleeve 1106 toward the ring gear 1102. Each leg 1114 terminates in a tooth 1116 configured to engage one of the slots 1110 in the ring gear 1102. The actuator sleeve is rotationally fixed relative to the housing, and is moveable axially between a first position for a first mode of operation (FIG. 13) and a second position for a second mode of operation (FIG. 14). In the first mode of operation (FIG. 13), the teeth 1116 of the actuator 1106 engage the slots 1110 in the ring gear 1102, preventing rotation of the ring gear, which allows torque to be transmitted from the transmission to the output spindle 1104. In the second mode of operation (FIG. 14), the teeth 1116 of the actuator 1106 do not engage the slots 1110 in the ring gear 1102, which allows the ring gear 1102 to rotate, thus interrupting torque transmission to the output spindle 1104.

To facilitate moving the actuation sleeve1106 between the first position and the second position, the actuation sleeve 1106 includes a ring-shaped permanent magnet 1118 coupled to the ring portion 1112 of the actuation sleeve 1106. In addition, received in a rear portion 1124 of the transmission housing 1184 is a first positioning member 1125 having a first ferromagnetic ring 1126 and a first ring-shaped electromagnet 1128. Received in the front portion 1120 of the transmission housing 1184 is a second positioning member 1127 having a second ferromagnetic ring 1120 and a second ring-shaped electromagnet 1122. When the actuation sleeve 1106 is in the first position (FIG. 13) and neither electromagnet 1122, 1128 is actuated, the actuation sleeve 1106 tends to stay in the first position due to the attractive force between the ring magnet 1118 and the first ferromagnetic ring 1126 being greater than the attractive force between the ring magnet 1118 and the second ferromagnetic ring 1120 (due to the closer proximity to the first ferromagnetic ring 1120).

To move the actuation sleeve 1106 to the second position (FIG. 14), the first electromagnet 1128 can be momentarily energized to create a repulsive force against the ring magnet 1118 and/or the second electromagnet 1120 can be momentarily energized to generate an attractive force with the ring magnet 1118, with the sum of these forces being greater than the attractive force between the ring magnet 1118 and the first ferromagnetic ring 1126. Once these forces cause the actuator sleeve 1106 to move to the second position (FIG. 14), the electromagnets 1122, 1128 can be de-energized, and the actuator sleeve 1106 will remain in the second position due to the attractive force between the ring magnet 1118 with the second ferromagnetic ring 1120 being greater than the attractive force between the ring magnet 1118 and the first ferromagnetic ring (due to closer proximity to the second ferromagnetic ring 1120).

To return the actuation sleeve 1106 to the first position (FIG. 13), the first electromagnet 1128 can be momentarily energized to create an attractive force with the ring magnet 1118 and/or the second electromagnet 1120 can be momentarily energized to generate a repulsive force against the ring magnet 1118, with the sum of these forces being greater than the attractive force between the ring magnet 1118 and the second ferromagnetic ring 1120. Once these forces cause the actuator sleeve 1106 to move to the first position (FIG. 13), the electromagnets 1122, 1128 can be de-energized, and the actuator sleeve 1106 will remain in the first position, as discussed above. The transmission housing may also include mechanical stops 1130 and 1132 in front of each of the ferromagnetic rings 1120, 1126 to prevent complete contact between the ring magnet 1118 and the ferromagnetic rings 1120, 1126, in order to require less force to move the actuator sleeve 1106 between the first and second positions.

Figure 15:
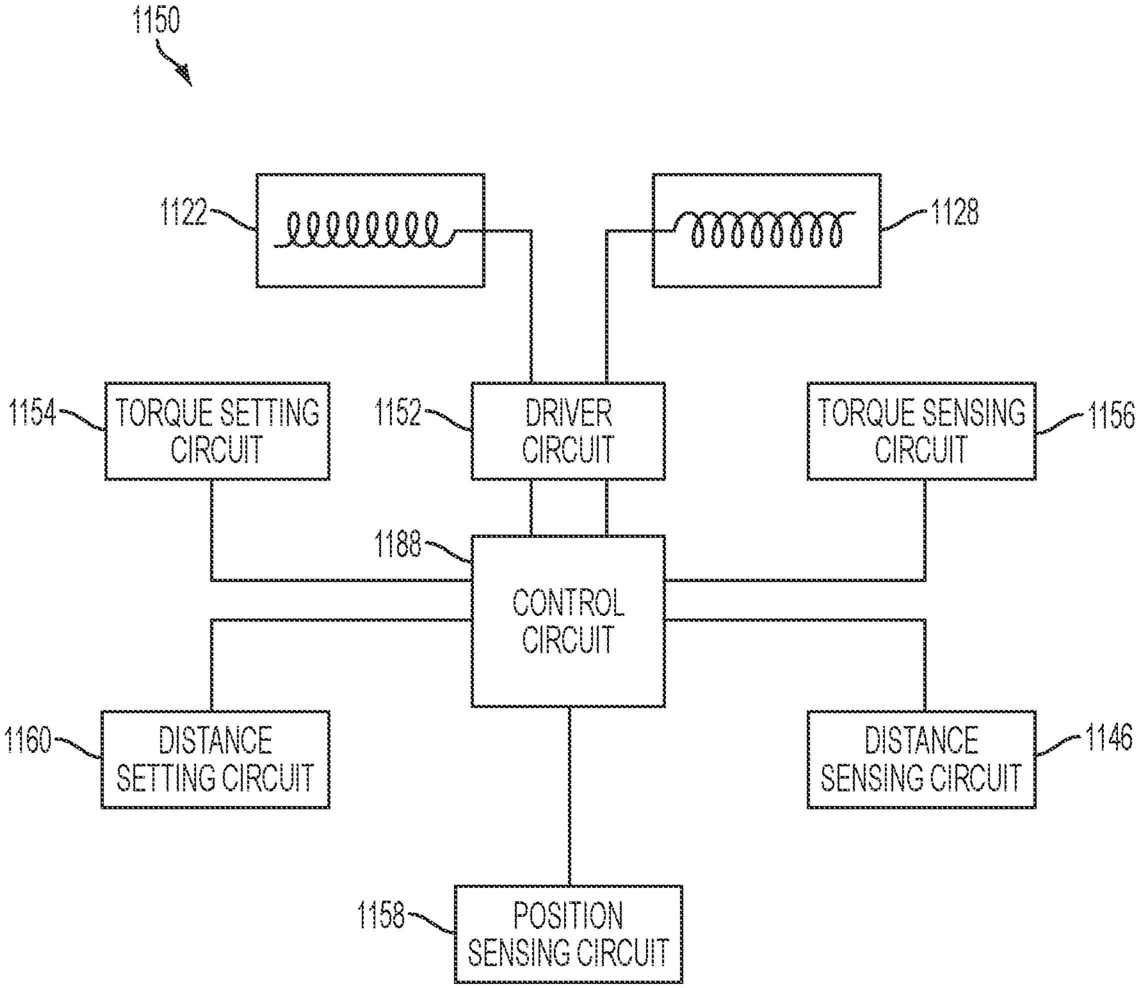
FIG. 15 is a schematic representation of an electronics module of the mode change mechanism of FIGS. 12 and 13.

Referring also to FIG. 15, the electromagnets 1122, 1128 each may be coupled to an electronics module 1150 that includes a driver circuit 1152 (e.g., an H-bridge circuit) configured to drive the electromagnets 1122, 1128. The driver circuit 1158 may be connected to the output of the control circuit 1188 (e.g., a microprocessor or controller). The control circuit 1188 may receive an input from a torque setting circuit 1154 that generates a signal corresponding to a desired torque setting. The desired torque setting may be input from a user interface 1148 (e.g., buttons or electronic controls) coupled to the housing. The control circuit 1188 may also receive an input from a torque sensing circuit 1156 that generates a signal that corresponds to the amount of output torque on the tool. The torque sensing circuit 1156 may include one or more of a current sensor, a position sensor, a torque transducer, a force sensor, etc. In one possible embodiment, the torque sensing circuit is similar to the electronic clutch circuit described in the aforementioned commonly owned U.S. patent application Ser. No. 13/798,210, filed Mar. 13, 2013, which is incorporated by reference.

The control circuit 1188 may also receive an input from a distance setting circuit 1160. The distance setting circuit 1160 that generates a signal corresponding to a desired distance from the workpiece at which the electromagnetic clutch should interrupt torque transmission. The desired distance setting may be input from the user interface 1148. The control circuit 1188 also receives an input from a distance sensing circuit 1146 that generates a signal that corresponds to a sensed distance between the tool and the workpiece. The distance sensing circuit is coupled to a proximity sensor system 1140 that includes a optical generator (e.g., an LED, light or laser generator) 1142 and an optical detector 1144. Based on input from the optical detector 1144 corresponding to the intensity of light reflected from the workpiece, the distance sensing circuit 1146 generates a signal that corresponds to the sensed distance from the workpiece. Other optical and non-contact devices may be used to sense distance from a workpiece.

The user interface may also enable the user to select between a distance sensing mode of operation and a torque sensing mode of operation. In addition, the control circuit may receive an input signal from a position sensing circuit 1158, which corresponds the current position of the actuation sleeve 1106 (e.g., via a Hall effect sensor or a membrane potentiometer). The controller processes the torque setting input signal, the torque sensing input signal, the distance setting input signal, the distance sensing input signal, and the position sensing input signal to determine when and in which direction to cause the drive circuit to energize the electromagnets to change the position of the actuation sleeve 1106.

Figure 16A:
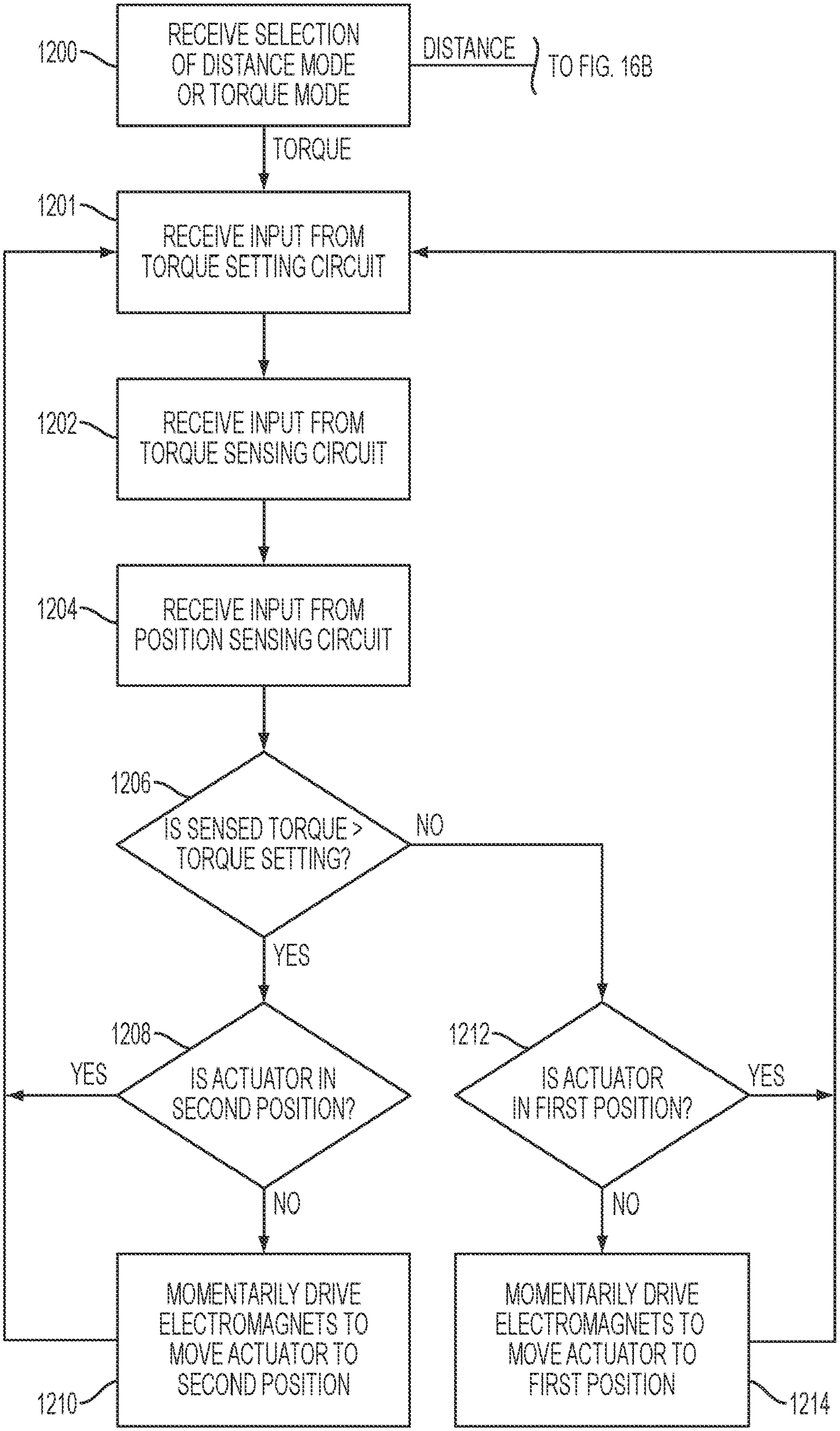
FIGS. 16A and 16B are flow charts illustrating the operation of the mode change mechanism of FIGS. 12 and 13.

Referring to FIG. 16A, in use, at step 1200, the control circuit first receives a user input of whether to use the distance sensing mode or the torque sensing mode. If the distance sensing mode is selected, the control circuit performs the steps illustrated in FIG. 16B, as described below. If the torque sensing mode is selected, then at step 1201, the control circuit receives the input signal from the torque setting circuit that corresponds to the desired torque setting. At step 1202, the control circuit receives the input signal from the torque sensing circuit that indicates the output torque. At step 1204, the control circuit receives the input signal from the position sensing circuit that indicates whether the actuator is in the first position or the second position. At step 1206, the control circuit determines whether the sensed torque has exceeded the desired threshold torque, which indicates that torque transmission should be interrupted. If YES, then at step 1208, the control circuit determines whether the actuator is already in the second position (FIG. 14), in which torque transmission is interrupted. If YES, then control circuit returns to step 1201. If NO, then at step 1210, the control circuit causes the drive circuit to momentarily drive the electromagnets to move the actuator sleeve from the first position to the second position to interrupt torque transmission. Once the actuator sleeve is in the second position, current need not be delivered to the electromagnets to keep the actuator sleeve in the second position, as the attractive force between the permanent magnet ring and the second ferromagnetic ring will do this. By requiring only a momentary burst of current, this saves energy and drain on a battery (if a cordless tool).

If, at step 1206, the control circuit determines that the sensed torque does not exceed the torque setting, this indicates that torque transmission should be permitted. Next, at step 1212, the control circuit determines whether the actuator is already in the first position (FIG. 13), in which torque transmission is permitted. If YES, then control circuit returns to step 1201. If NO, then, at step 1214, the control circuit causes the drive circuit to momentarily drive the electromagnets to move the actuator sleeve away from the second position to the first position to allow torque transmission. Once the actuator sleeve is in the first position, current need not be delivered to the electromagnets to keep the sleeve in the first position, as the attractive force between the permanent ring magnet and the first ferromagnetic ring will keep the sleeve in the first position. By requiring only a momentary burst of current, this saves energy and drain on a battery (if a cordless tool).

Figure 16B:
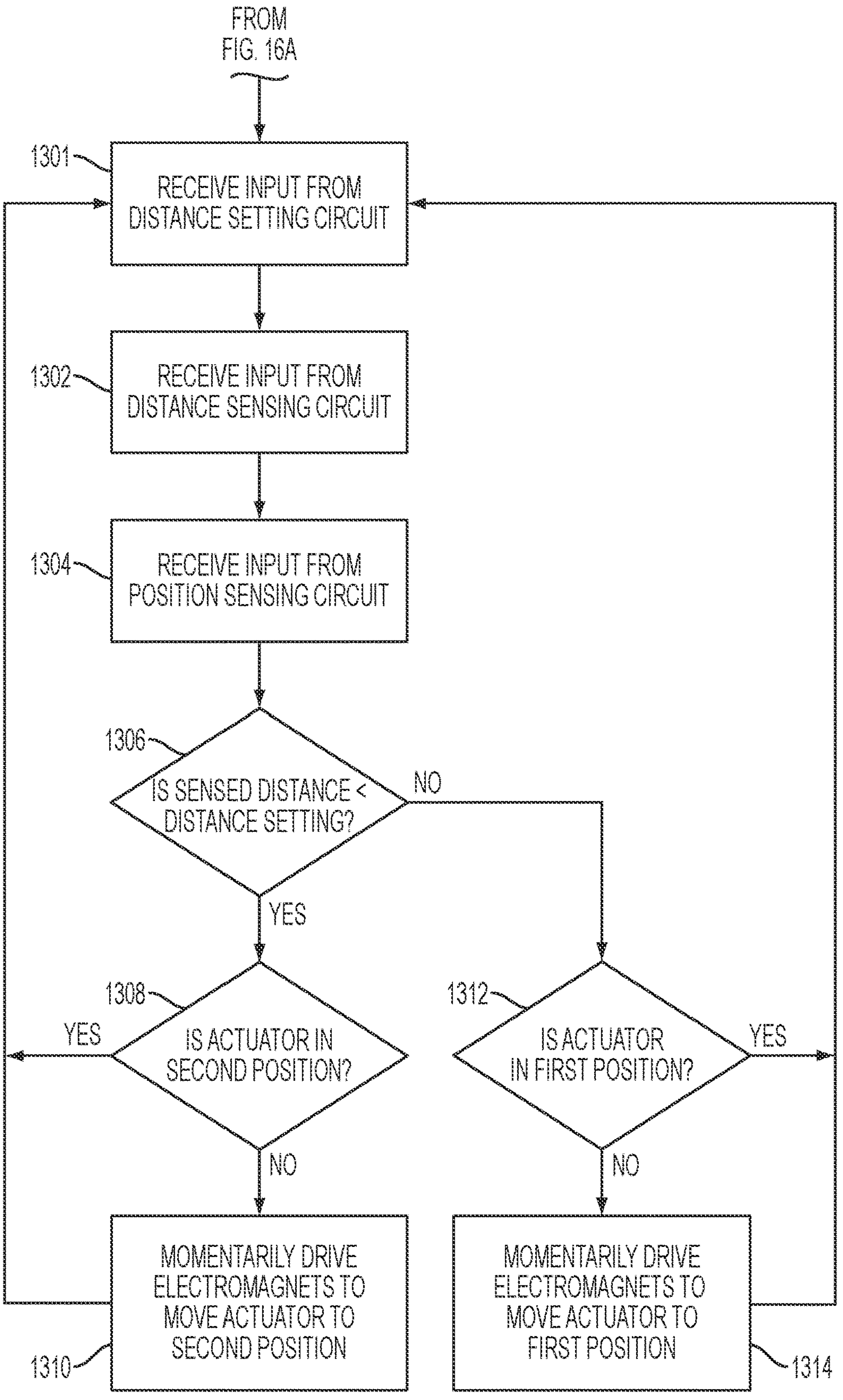
Figure 17:
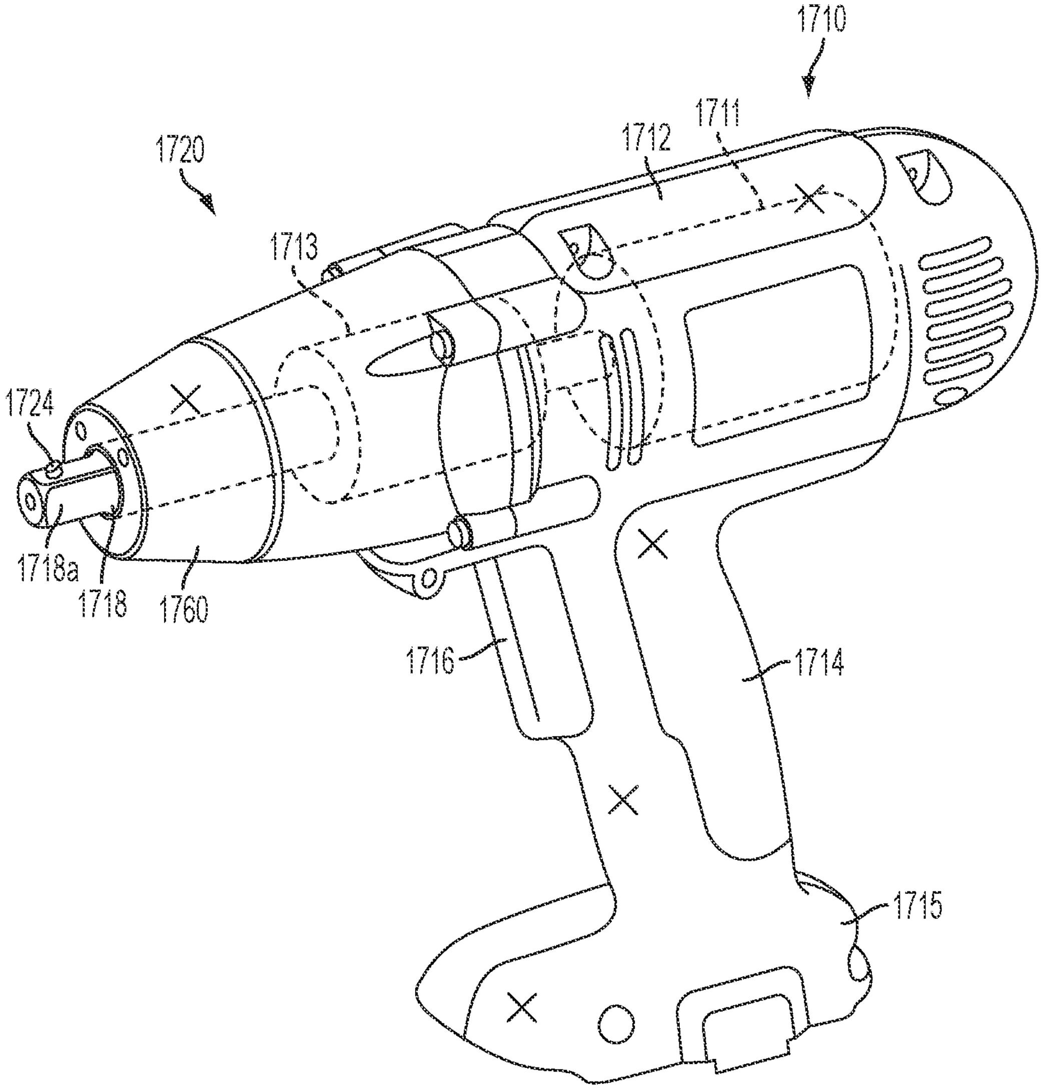
FIG. 17 is a perspective view of another embodiment of a power tool having a fifth embodiment of a mode change mechanism.

Referring to FIG. 16B, if, at step 1200 in FIG. 16A, the distance sensing mode is selected, then at step 1301, the control circuit receives the input signal from the distance setting circuit that corresponds to the desired distance setting for when to interrupt torque transmission. At step 1302, the control circuit receives the input signal from the distance sensing circuit that indicates the sensed distance of the tool holder from the workpiece. At step 1304, the control circuit receives the input signal from the position sensing circuit that indicates whether the actuator sleeve is in the first position or the second position. At step 1306, the control circuit determines whether the sensed distance is less than the desired threshold distance, which indicates that torque transmission should be interrupted. If YES, then at step 1308, the control circuit determines whether the actuator is already in the second position (FIG. 14), in which torque transmission is interrupted. If YES, then control circuit returns to step 1301. If NO, then at step 1310, the control circuit causes the drive circuit to momentarily drive the electromagnets to move the actuator sleeve from the first position to the second position to interrupt torque transmission. Once the actuator sleeve is in the second position, current need not be delivered to the electromagnets to keep the actuator sleeve in the second position, as the attractive force permanent magnet ring and the second ferromagnetic ring will do this. By requiring only a momentary burst of current, this saves energy and drain on a battery (if a cordless tool).

If, at step 1306, the control circuit determines that the sensed distance is not less than the distance setting, this indicates that torque transmission should be permitted. Next, at step 1312, the control circuit determines whether the actuator is already in the first position (FIG. 13), in which torque transmission is permitted. If YES, then control circuit returns to step 1301. If NO, then, at step 1314, the control circuit causes the drive circuit to momentarily drive the electromagnets to move the actuator sleeve away from the second position to the first position to allow torque transmission. Once the actuator sleeve is in the first position, current need not be delivered to the electromagnets to keep the sleeve in the first position, as the attractive force between the permanent ring magnet and the first ferromagnetic ring will keep the sleeve in the first position. By requiring only a momentary burst of current, this saves energy and drain on a battery (if a cordless tool).

Referring to FIGS. 17-20, in another embodiment, a power tool such as an impact wrench 1710 includes an electromagnetic mode change mechanism in the form of an electromagnetically actuatable socket holder 1720. The impact wrench 1710 includes a housing 1712 having a handle 1714, a trigger mechanism 1716 for activating the impact wrench 1710, and a cover 1760 at a front of the housing 1712. A base 1715 of the handle 1714 is adapted to receive a battery pack (not shown) for use as a cordless impact wrench. It should be understood that the present disclosure can also be applied to pneumatic, hydraulic and corded electrical impact wrench devices. The impact wrench includes a motor 1711 disposed within the housing 1712 that drives a transmission and impact mechanism 1713, which in turn drives an anvil 1718 extending from the front end of the housing 1712, as is generally known in the art, and as described in the aforementioned U.S. patent application Ser. No. 13/494,325. The anvil 1718 includes a square socket drive **1718*a*** that is designed to drive a socket wrench (not shown).

The mode change mechanism in the form of the electromagnetically actuatable socket holder 1720 is configured to selectively retain a socket wrench on the square drive **1718*a*. The socket holder 1720 includes a radially extending and retractable retainer pin 1724 configured to engage the socket wrench when it is coupled to the square socket drive 1718*a*. The retainer pin 1724 is received in a radial aperture 1723 in a distal end of the square socket drive 1718*a*. A lever pin 1730 is received in an axially extending bore 1732 provided in the anvil 1718. The lever pin 1730 has a rear end portion with a partially spherical pivot end 1750 received in a concave partially conical bore portion 1732*a* of the bore 1732. The lever pin 1730 also has a front end portion that engages a transverse aperture 1734 provided in the retention pin 1724. In addition, the lever pin 1730 has a mid portion that engages a transverse aperture in an actuator pin 1748. The actuator pin 1748 is received in a transverse bore 1727 in a proximal portion of the anvil 1718. The actuator pin 1748 is biased to a radially outward direction by a spring 1726 that is received in the transverse bore 1727**.

Figure 18A:
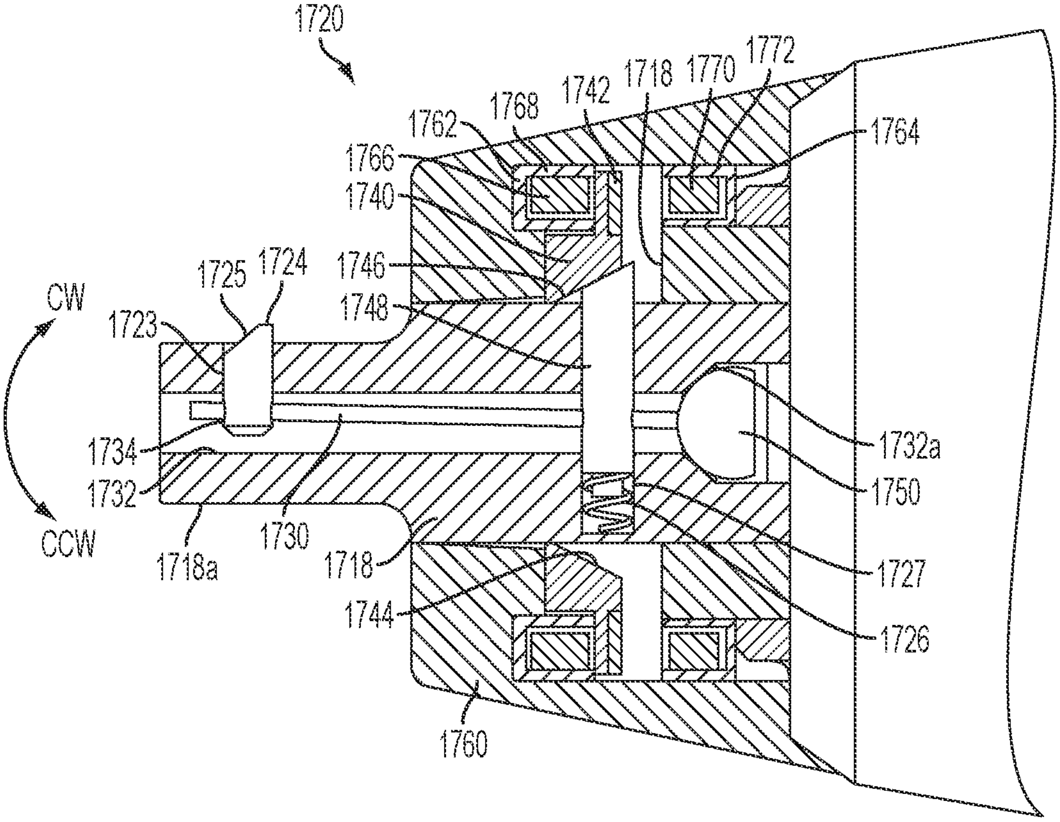
FIG. 18A is a cross-sectional view of the mode change mechanism of the tool of FIG. 17 in a first mode of operation.
Figure 18B:
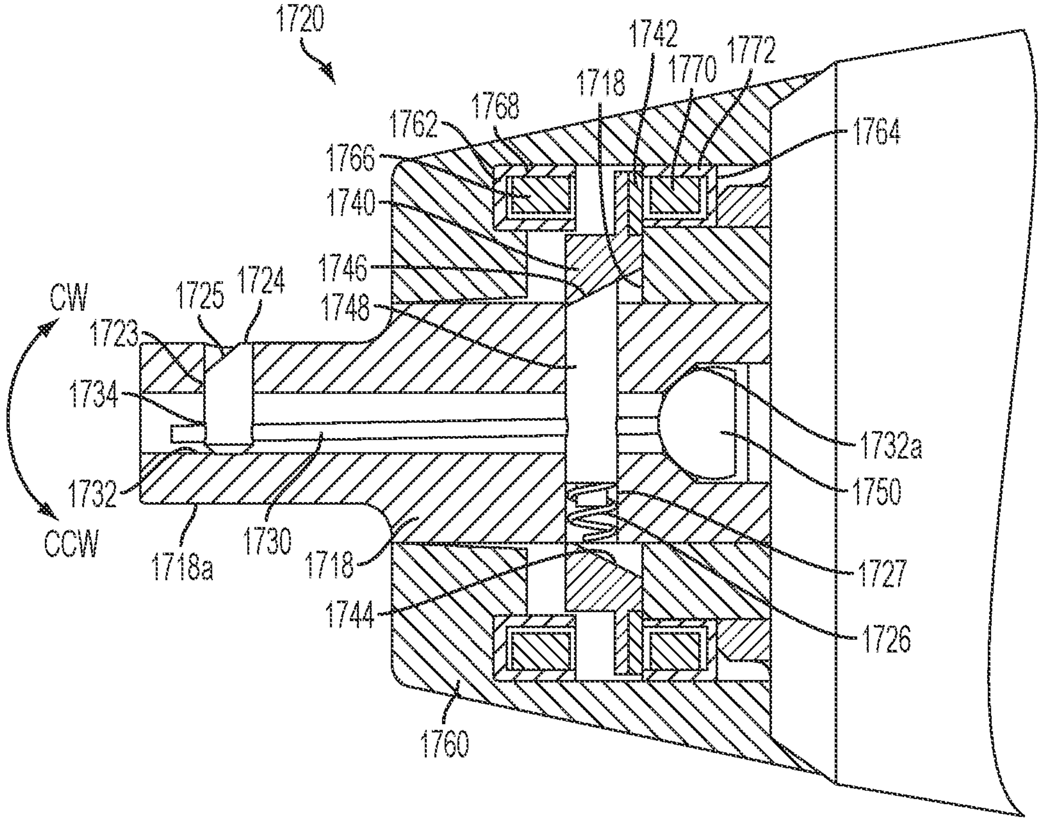
FIG. 18B is a cross-sectional view of the mode change mechanism of the tool of FIG. 17 in a second mode of operation.
Figure 19:
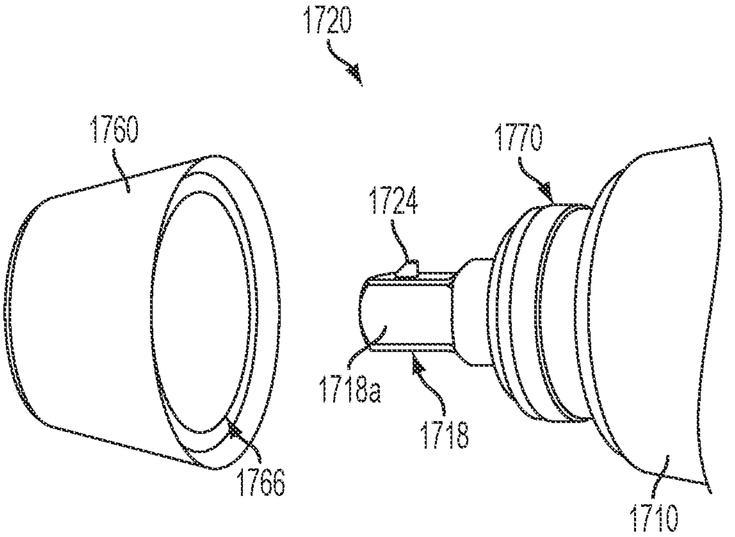
FIGS. 19 and 20 are partially exploded views of the mode change mechanism of the tool of FIG. 17.
Figure 20:
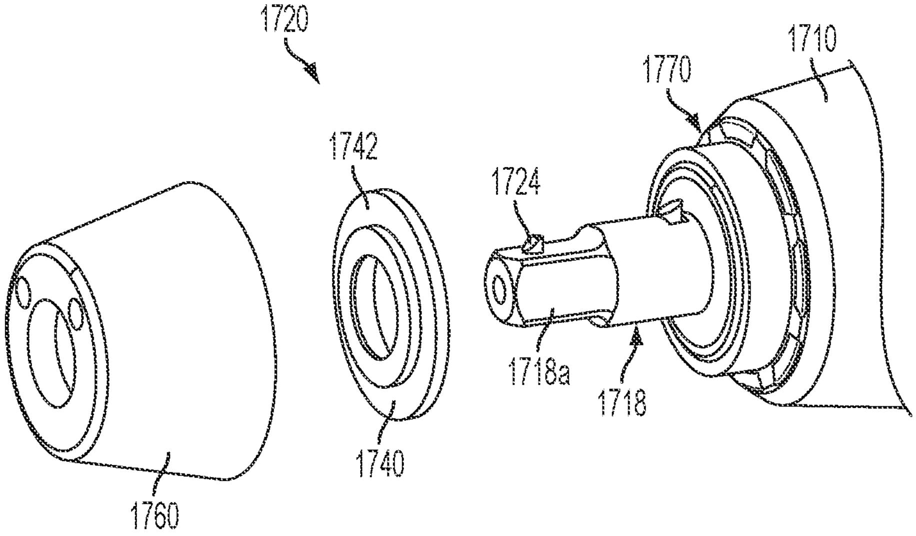

Disposed inside of the cover 1760 is an actuator in the form of an axially moveable cam ring 1740, a first positioning member in the form of an axially stationary forward ring 1762, and a second positioning member in the form of an axially stationary rearward ring 1764. The cam ring 1740 has an inner cam surface 1746 disposed against an outer cam surface 1744 of the actuator pin 1748. The cam ring is moveable between a forward position for a first mode of operation (FIG. 18A) and a rearward position for a second mode of operation (FIG. 18B). The forward ring 1762 includes a forward electromagnetic coil 1766 disposed in a first annular ferromagnetic (e.g., steel) cup 1768. The rearward ring 1764 includes a rearward electromagnetic coil 1770 disposed in a second annular ferromagnetic (e.g., steel) cup 1772. The cam ring 1740 is disposed between the forward and rearward rings 1762, 1764 and includes an integral permanent magnet ring 1742.

The forward and rearward electromagnetic coils 1766, 1770 may be selectively energized to move the cam ring 1740 between its forward or rearward position. To move the cam ring 1740 to its rearward position (FIG. 18B), the front electromagnet 1766 can be momentarily energized to create a repulsive force against the ring magnet 1742 and/or the rear electromagnet 1770 can be momentarily energized to generate an attractive force with the ring magnet 1742, with the sum of these forces being greater than the attractive force between the ring magnet 1742 and the first ferromagnetic cup 1768. Once these forces cause the cam ring 1742 to move to the rearward position (FIG. 18B), the electromagnets 1766, 1770 can be de-energized, and the cam ring 1742 will remain in the rearward position due to the attractive force between the ring magnet 1742 with the second ferromagnetic cup 1772 being greater than the attractive force between the ring magnet 1742 and the first ferromagnetic cup 1768 (due to closer proximity to the second ferromagnetic cup 1772).

To return the cam ring 1740 to the first position (FIG. 18A), the forward electromagnet 1766 can be momentarily energized to create an attractive force with the ring magnet 1742 and/or the rearward electromagnet 1770 can be momentarily energized to generate a repulsive force against the ring magnet 1742, with the sum of these forces being greater than the attractive force between the ring magnet 1742 and the rearward ferromagnetic cup 1772. Once these forces cause the cam ring 1742 to move to the first position (FIG. 18A), the electromagnets 1766, 1770 can be de-energized, and the cam ring 1740 will remain in the forward position due to the attractive force between the ring magnet 1742 and the first ferromagnetic cup 1768 being greater than the attractive force between the ring magnet 1742 and the second ferromagnetic cup 1772 (due to the closer proximity to the first ferromagnetic cup 1768).

Once in the forward or rearward positions the permanent magnet 1742 is attracted to the first annular cup 1768 if in the forward position, or the second annular cup 1772 if in the second position. Thus only a pulse of energy is required to change the position of the cam ring 1740 and thus the mode of operation. Continuous power is not required to hold the cam ring in either the forward or rearward position and this is advantageous for energy conservation on a cordless tool.

Further, it should be understood that the electromagnetically actuatable socket holder 1720 can be operated using a single coil and a spring for biasing the cam ring away from the coil during a non-activated state. The cover 1760 may also include mechanical stops (not shown) between each of the ferromagnetic cups 1768, 1772 and the ring magnet 1742 to prevent complete contact between the ring magnet 1742 and the ferromagnetic cups 1768, 1768, in order to require less force to move the cam ring 1740 between the forward and rearward positions.

When the electromagnets cause the cam ring 1746 to move to its rearward position in the second mode of operation (FIG. 18B), the cam surface 1746 of the cam ring 1724 engages the cam surface 1744 of the actuator pin 1748, causing the actuator pin 1748 to move downward in the bore 1727 in the anvil 1718 against the biasing force of the spring 1726. As the actuator pin 1748 is moved downward, the lever pin 1732 pivots in a counter clockwise direction CCW about pivot end 1750, causing the retainer pin 1724 to be moved radially inward to a retracted or release position. Once the retainer pin 1724 is in the release position, the socket wrench can be removed from the square socket drive 1718*a*. When cam ring 1724 moves to its forward axial position in the first mode of operation (FIG. 18A), the spring 1726 causes the actuator pin 1748 to move upward. causing the lever pin 1730 to rotate in a clockwise direction CW so that the retainer pin 1724 extends in an engaged position.

The first and second electromagnetic coils 1766, 1770 can be electrically connected to the tool battery or an alternative power source such as an A/C power source by a control circuit, such as one of the control circuits described above. A user-actuatable switch for controlling movement of the cam ring 1740 by the electromagnets can be placed at one or more of multiple different locations on the power tool 1710, as indicated by the X's in FIG. 17. Thus, the socket release mechanism can be controlled from virtually any location on the tool. It should be understood that this type of electromechanical socket release mechanism can be used with any of the other disclosed embodiments for a socket release mechanism described in U.S. patent application Ser. No. 13/494,325.

Numerous other modifications may be made to the exemplary implementations described above. For example, any of the above-described combinations of permanent magnet and electromagnetic assemblies may be exchanged from any of the other combinations. The above-described electromagnetic assemblies for moving actuators can be used for any other applications or designs of power tools that require movement of actuators among two or more positions. These and other implementations are within the scope of the following claims.

What is claimed is:

1. An actuator assembly for a power tool, comprising:

a positioning member remaining axially stationary along an axis;

an actuator moveable along the axis between a first position closer to the positioning member that corresponds to a first mode of operation of the power tool, and a second position further from the positioning member that corresponds to a second mode of operation of the power tool;

a first permanent magnet assembly fixed to the actuator and a second permanent magnet assembly fixed to the positioning member, wherein the first permanent magnet assembly and the second permanent magnet assembly are configured to attract each other by an attractive force when the actuator is in the first position and to repel each other by a repulsive force when the actuator is in the second position; and an electromagnet axially stationary relative to the positioning member, wherein when the actuator is in the first position, the electromagnet can be momentarily energized to generate a magnetic force sufficient to overcome the attractive force and move the actuator to the second position, where the actuator will be maintained in the second position after the electromagnet is deenergized due to the repulsive force, and when the actuator is in the second position, the electromagnet can be momentarily energized to generate a magnetic force sufficient to overcome the repulsive force and move the actuator to the first position, where the actuator will be maintained in the first position after the electromagnet is deenergized due to the attractive force.

2. The actuator assembly of claim 1, wherein the first permanent magnet assembly includes a first plurality of permanent magnets and the second permanent magnet assembly includes a second plurality of permanent magnets, with a first portion of the first plurality of permanent magnets and a first portion of the second plurality of permanent magnets arranged to exert the attractive force and a second portion of the first plurality of permanent magnets and a second portion of the second plurality of permanent magnets are arranged to exert the repulsive force.

3. The actuator assembly of claim 2, wherein the first plurality of permanent magnets and the second plurality of permanent magnets each comprise an array of correlated magnets.

4. The actuator assembly of claim 2, wherein the first plurality of permanent magnets comprises a first magnet and a second magnet arranged so that they have the same polarity as each other along the axis, and the second plurality of magnets comprises a third magnet and a fourth magnet arranged so that they have the opposite polarity from each other along the axis.

5. The actuator assembly of claim 1, wherein the electromagnet can be momentarily energized by current flowing in a first direction to move the actuator from the first position to the second position, and can be momentarily energized by current flowing in a second opposite direction to move the actuator from the second position to the first position.

6. The actuator assembly of claim 1, further comprising a control circuit configured to control energization of the electromagnet in response to an input condition, the input condition comprising at least one of a user selection of a desired power tool operating condition or a sensed power tool operating condition.

7. The actuator assembly of claim 1, wherein the actuator, the positioning member, and the electromagnet comprise a portion of a clutch of the power tool, the clutch having an input member coupled to a transmission of the power tool, an output member coupled to an output shaft of the power tool, and a coupling device movable between a driving position in which torque is transmitted from the input member to the output member and a clutching position in which torque transmission from the input member to the output member is interrupted, and wherein when the actuator is in the first position, the actuator retains the coupling member in the driving position, and when then actuator is in the second position, the actuator allows the coupling member to move to the clutching position.

8. The actuator assembly of claim 7, wherein the input member comprises an input sleeve defining a radial bore, the output member comprises an output cylinder received in the input sleeve defining a groove, the coupling member comprises a drive ball received in the bore, and the actuator comprises a actuation sleeve received over the input sleeve, wherein when the actuation sleeve is in the first position, the ball is retained in the groove to transmit torque from the input sleeve to the output cylinder, and when the actuation sleeve is in the second position, the ball is permitted to escape the groove to interrupt torque transmission from the input sleeve to the output cylinder.

9. The actuator assembly of claim 7, wherein the input member comprises a ring gear of the transmission having a recess, the output member comprises a portion of the output shaft, the actuator comprises a sleeve, and the coupling member comprises a leg extending from the sleeve, wherein when the sleeve is in the first position, the leg engages the recess to inhibit rotation of the ring gear, which enables torque transmission to the output member, and when the sleeve is in the second position, the leg does not engage the recess to allow rotation of the ring gear, which interrupts torque transmission to the output member.

10. The actuator assembly of claim 1, wherein the actuator, the positioning member, and the electromagnet comprise a portion of a tool holder of the power tool, the tool holder coupled to the output shaft for releasably retaining a power tool accessory, wherein when the actuator is in the first position, the accessory is retained by the tool holder, and when the actuator is in the second position the accessory is releasable from the tool holder.

11. The actuator assembly of claim 10, wherein the tool holder comprises a socket drive having a retractable retention pin and a linkage coupled to the retention pin for selectively retracting the retention pin, and wherein the actuator comprises a ring configured to move the linkage and the retention pin between a retention position and a release position when the actuator is in the first position and the second position, respectively.

12. The actuator assembly of claim 1, further comprising a stop to prevent contact between the actuator and the positioning member when the actuator is in the first position.

13. An actuator assembly for a power tool, comprising:

an actuator moveable between a first position in which an output member of the power tool is coupled to an input member of the power tool so that movement of the input member causes movement of the output member and a second position in which the output member is decoupled from the input member so that movement of the input member does not cause movement of the output member;

a first permanent magnet assembly fixed to the actuator and a second permanent magnet assembly fixed to one of the input member and the output member, wherein the first permanent magnet assembly and the second permanent magnet assembly are configured to attract each other by an attractive force when the actuator is in the first position and to repel each other by a repulsive force when the actuator is in the second position; and an electromagnet disposed adjacent the actuator, wherein when the actuator is in the first position, the electromagnet can be momentarily energized to generate a magnetic force sufficient to overcome the attractive force and move the actuator to the second position, where the actuator will be maintained in the second position after the electromagnet is deenergized due to the repulsive force, and when the actuator is in the second position, the electromagnet can be momentarily energized to generate a magnetic force sufficient to overcome the repulsive force and move the actuator to the first position, where the actuator will be maintained in the first position after the electromagnet is deenergized due to the attractive force.

14. The actuator assembly of claim 13, wherein the first permanent magnet assembly includes a first plurality of permanent magnets and the second permanent magnet assembly includes a second plurality of permanent magnets, with a first portion of the first plurality of permanent magnets and a first portion of the second plurality of permanent magnets arranged to exert the attractive force and a second portion of the first plurality of permanent magnets and a second portion of the second plurality of permanent magnets are arranged to exert the repulsive force.

15. The actuator assembly of claim 14, wherein the first plurality of permanent magnets and the second plurality of permanent magnets each comprise an array of correlated magnets.

16. The actuator assembly of claim 14, wherein the first plurality of permanent magnets comprises a first magnet and a second magnet arranged so that they have the same polarity as each other along the axis, and the second plurality of magnets comprises a third magnet and a fourth magnet arranged so that they have the opposite polarity from each other along the axis.

17. The actuator assembly of claim 13, wherein the electromagnet can be momentarily energized by current flowing in a first direction to move the actuator from the first position to the second position, and can be momentarily energized by current flowing in a second opposite direction to move the actuator from the second position to the first position.

18. The actuator assembly of claim 17, wherein the input member is coupled to a transmission of the power tool, the output member is coupled to an output shaft of the power tool, and further comprising a coupling device movable between a driving position in which torque is transmitted from the input member to the output member and a clutching position in which torque transmission from the input member to the output member is interrupted.

19. The actuator assembly of claim 18, wherein when the actuator is in the first position, the actuator retains the coupling member in the driving position, and when then actuator is in the second position, the actuator allows the coupling member to move to the clutching position.

20. The actuator assembly of claim 19, wherein the input member comprises an input sleeve defining a radial bore, the output member comprises an output cylinder received in the input sleeve defining a groove, the coupling member comprises a drive ball received in the bore, and the actuator comprises a actuation sleeve received over the input sleeve, wherein when the actuation sleeve is in the first position, the ball is retained in the groove to transmit torque from the input sleeve to the output cylinder, and when the actuation sleeve is in the second position, the ball is permitted to escape the groove to interrupt torque transmission from the input sleeve to the output cylinder.

* * * * *